United States Patent
He et al.

(10) Patent No.: US 12,526,657 B2
(45) Date of Patent: Jan. 13, 2026

(54) SENSING METHODS AND DEVICES

(71) Applicant: GUANGDONG OPPO MOBILE TELECOMMUNICATIONS CORP., LTD., Dongguan (CN)

(72) Inventors: Shiwen He, Dongguan (CN); Ning Gao, Dongguan (CN); Shiyue Huang, Dongguan (CN); Kangli Cai, Dongguan (CN); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/217,393

(22) Filed: May 23, 2025

(65) Prior Publication Data
US 2025/0287229 A1    Sep. 11, 2025

Related U.S. Application Data

(63) Continuation of application No. PCT/CN2023/078436, filed on Feb. 27, 2023.

(51) Int. Cl.
H04W 24/02    (2009.01)
(52) U.S. Cl.
CPC .................................. H04W 24/02 (2013.01)
(58) Field of Classification Search
CPC ..................................................... H04W 24/02
See application file for complete search history.

(56) References Cited

U.S. PATENT DOCUMENTS

2025/0113217 A1*    4/2025    Saad .................... H04B 7/0626

FOREIGN PATENT DOCUMENTS

CN    115623456 A    1/2023

OTHER PUBLICATIONS

International Search Report in the international application No. PCT/CN2023/078436, mailed on Nov. 9, 2023, 5 pages with English translation.
English translation of the Written Opinion of the International Search Authority in the international application No. PCT/CN2023/078436, mailed on Nov. 9, 2023, 6 pages with English translation.
IEEE Standards Activities Department 445 Hoes Lane Piscataway, NJ 08854, USA, "Part 11: Wireless LAN Medium Access Control (MAC) and Physical Layer (PHY) Specifications Amendment 2: Enhancements for Wireless LAN Sensing", Draft Standard for Information technology-Tele-communications and information exchange between systems Local and metropolitan area networks—Specific requirements, IEEE P802.11bf/D1.0, Jan. 2023, pp. 22-43 and pp. 167-190.

* cited by examiner

*Primary Examiner* — Wayne H Cai
(74) *Attorney, Agent, or Firm* — BAYES PLLC

(57) ABSTRACT

A sensing methods and a device are provided. A first device sends target scheduling information to a second device, the target scheduling information being used for determining a participation state of the second device in directional multi-gigabit (DMG) sensing measurement, the first device being a sensing initiation device or a sensing proxy device, and the second device being a sensing response device.

20 Claims, 21 Drawing Sheets

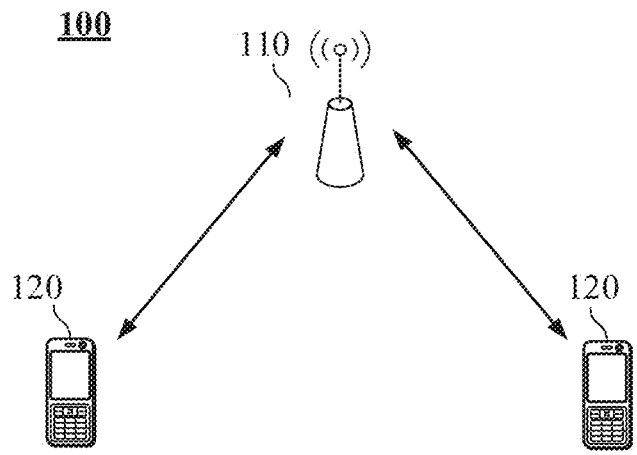

| Subelement ID | Length | Number Beam Indices | Beam Index 1 | ... | Beam Index N | Padding |
|---|---|---|---|---|---|---|

Bits: 8, 8, 8, 12, , 12, 0-7

FIG. 5

| Subelement ID | Length | Start of Burst | Inter Burst Interval | Intra Burst Interval |
|---|---|---|---|---|

Octets: 1, 1, 4, 1, 2

| Number TX Beams Per Instance | Repeat Per Instance | Number Bursts | Number of Instances per Burst |
|---|---|---|---|

Octets: 1, 1, 4, 1

FIG. 6

| Subelement ID | Length | Burst Response Delay |
|---|---|---|

Octets: 1, 1, 8

FIG. 7

Table 1:

| Bits | B0–B7 | B8–B15 | B16–B23 | B24–B26 | B27–B29 | B30–B37 | B38–B40 | B41–B42 |
|---|---|---|---|---|---|---|---|---|
| Field | DMG Measurement Setup ID | Measurement Burst ID | Sensing Instance SN | Sensing Type | STA ID | First Beam Index | Num of STAs in Instance | Num of PPDUs in Instance |
| Bits | 8 | 8 | 8 | 3 | 3 | 8 | 3 | 2 |

Table 2:

| Bits | B43–B50 | B51–B58 | B59–B60 | B61–B64 | B65–B66 | B67 | B68–B75 | B76 |
|---|---|---|---|---|---|---|---|---|
| Field | EDMG TRN Length | RX TRN-Units per Each TX TRN-Unit | EDMG TRNUnit P | EDMG TRNUnit M | EDMG TRNUnit N | TRN Subfield Sequence Length | BW | Sense Multiple Golays |
| Bits | 8 | 8 | 2 | 4 | 2 | 1 | 8 | 1 |

Table 3:

| Bits | B77–B79 | B80 | B81–B88 | B89–B96 | B97 B8×(n-1) |
|---|---|---|---|---|---|
| Field | Sense Golay Index | Monostatic Sounding Mode | Num of TX Beams in Instances | Num of Repeat in Instance | Updated TX Beam Lis |
| Bits | 3 | 1 | 8 | 8 | variable |

| Subelement ID | Length | Start of Burst | Inter Burst Interval | Intra Burst Interval | Number TX Beams Per Instance | Repeat Per Instance |
|---|---|---|---|---|---|---|
| 8 | 8 | 32 | 8 | 16 | 8 | 8 |

Bits:

| Number Bursts | Number of Instances per Burst | First Number | Second Number | Instance or Burst | Presence State in First DMG Sensing unit | Reserved |
|---|---|---|---|---|---|---|
| 32 | 8 | 8 | 8 | 1 | 1 | 6 |

Bits:

FIG. 20

| Subelement ID | Length | Start of Burst | Inter Burst Interval | Intra Burst Interval | Number TX Beams Per Instance | Repeat Per Instance |
|---|---|---|---|---|---|---|
| 8 | 8 | 32 | 8 | 16 | 8 | 8 |

Bits:

| Number Bursts | Number of Instances per Burst | Scheduling Cycle of Presence state | Third Number | Instance or Burst | Presence state in First DMG Sensing unit | Reserved |
|---|---|---|---|---|---|---|
| 32 | 8 | 8 | 8 | 1 | 8 | 7 |

Bits:

FIG. 21

| Subelement ID | Length | First Number | Second Number | Instance or Burst | Presence State in First DMG Sensing unit | Reserved |
|---|---|---|---|---|---|---|
| 8 | 8 | 8 | 8 | 1 | 1 | 6 |

Bits:

FIG. 22

| Subelement ID | Length | Scheduling cycle of presence state | Third Number | Instance or Burst | Presence State in First DMG Sensing unit | Reserved |
|---|---|---|---|---|---|---|
| 8 | 8 | 8 | 8 | 1 | 8 | 7 |

Bits:

FIG. 23

| Bits: | B0 | B7 | B8 | B15 | B16 | B23 | B24 | B26 | B27 | B29 | B30 | B37 |
|---|---|---|---|---|---|---|---|---|---|---|---|---|
| | DMG Measurement Setup ID | | Measurement Burst ID | | Sensing Instance SN | | Sensing Type | | STA ID | | First Beam Index | |
| | 8 | | 8 | | 8 | | 3 | | 3 | | 8 | |

| Bits: | B38 | B40 | B41 | B42 | B43 | B50 | B51 | B58 | B59 | B60 | B61 | B64 |
|---|---|---|---|---|---|---|---|---|---|---|---|---|
| | Num of STAs in Instance | | Num of PPDUs in Instance | | EDMG TRN Length | | RX TRN-Units per Each TX TRN-Unit | | EDMG TRNUnit P | | EDMG TRNUnit M | |
| | 3 | | 2 | | 8 | | 8 | | 2 | | 4 | |

| Bits: | B65 | B66 | B67 | B68 | B75 | B76 | B77 | B79 | B80 | B81 | B88 |
|---|---|---|---|---|---|---|---|---|---|---|---|
| | EDMG TRNUnit N | | TRN Subfield Sequence Length | | BW | | Sense Multiple Golays | | Sense Golay Index | Monostatic Sounding Mode | Num of TX Beams in Instances |
| | 2 | | 1 | | 8 | | 1 | | 3 | 1 | 8 |

| Bits: | B89 | B96 | B97 | B104 | B105 | B106 | B111 | B112 | B(8×n-1) |
|---|---|---|---|---|---|---|---|---|---|
| | Num of Repeat in Instances | | Fourth Number | | Instance or Burst | Reserved | | Updated TX Beam Lis | |
| | 8 | | 8 | | 1 | 6 | | variable | |

| Bits: | B0 — B7 | B8 — B15 | B16 — B23 | B24 — B26 | B27 — B29 | B30 — B37 |
|---|---|---|---|---|---|---|
| | DMG Measurement Setup ID | Measurement Burst ID | Sensing Instance SN | Sensing Type | STA ID | First Beam Index |
| | 8 | 8 | 8 | 3 | 3 | 8 |

| Bits: | B38 — B40 | B41 B42 | B43 — B50 | B51 — B58 | B59 B60 | B61 — B64 |
|---|---|---|---|---|---|---|
| | Num of STAs in Instance | Num of PPDUs in Instance | EDMG TRN Length | RX TRN-Units per Each TX TRN-Unit | EDMG TRNUnit P | EDMG TRNUnit M |
| | 3 | 2 | 8 | 8 | 2 | 4 |

| Bits: | B65 B66 | B67 | B68 — B75 | B76 | B77 — B79 | B80 | B81 — B88 |
|---|---|---|---|---|---|---|---|
| | EDMG TRNUnit N | TRN Subfield Sequence Length | BW | Sense Multiple Golays | Sense Golay Index | Monostatic Sounding Mode | Num of TX Beams in Instances |
| | 2 | 1 | 8 | 1 | 3 | 1 | 8 |

| Bits: | B89 — B96 | B97 — B104 | B105 — B111 | B112 — B(8×n-1) |
|---|---|---|---|---|
| | Num of Repeat in Instances | Fifth Number | Reserved | Updated TX Beam List |
| | 8 | 8 | 7 | variable |

| Element ID | Length | Element ID | DMG Measurement Setup ID | Measurement Burst ID | Sensing Instance SN |
|---|---|---|---|---|---|

Octets: 1, 1, 1, 1, 1, 1

| First Beam Index | Report Control | Fourth Number | Instance or Burst |
|---|---|---|---|

Octets: 1, 1, 1, 1

FIG. 26

| Element ID | Length | Element ID | DMG Measurement Setup ID | Measurement Burst ID | Sensing Instance SN |
|---|---|---|---|---|---|

Octets: 1, 1, 1, 1, 1, 1

| First Beam Index | Report Control | Fifth Number |
|---|---|---|

Octets: 1, 1, 1

FIG. 27

| Subelement ID | Length | Start of Burst | Inter Burst Interval | Intra Burst Interval |
|---|---|---|---|---|

Octets: 1, 1, 4, 1, 2

| Number TX Beams Per Instance | Repeat Per Instance | Number Bursts | Number of Instances per Burst | Max Number of STA per Instance |
|---|---|---|---|---|

Octets: 1, 1, 4, 1, 1

FIG. 28

| Subelement ID | Length | Start of Burst | Inter Burst Interval | Intra Burst Interval |
|---|---|---|---|---|
| 1 | 1 | 4 | 1 | 2 |

Octets:

| Number TX Beams Per Instance | Repeat Per Instance | Number Bursts | Number of Instances per Burst | maximum initialization time |
|---|---|---|---|---|
| 1 | 1 | 4 | 1 | 1 |

Octets:

FIG. 29

SENSING METHODS AND DEVICES

CROSS-REFERENCE TO RELATED APPLICATION

The present disclosure is a U.S. continuation application of International Application No. PCT/CN2023/078436 filed on Feb. 27, 2023. The disclosure of the above application is hereby incorporated by reference in its entirety.

BACKGROUND

In a Directional Multi-Gigabit (DMG) sensing scenario, a sensing responder can perform DMG sensing measurement based on a parameter negotiated during a DMG sensing measurement setup phase, which is not conducive to the power save of the sensing responder. Therefore, how to achieve the DMG sensing measurement with low power consumption is an urgent problem to be solved.

SUMMARY

Embodiments of the present disclosure relate to the field of communication, and in particular, to a sensing method and a sensing device.

In the first aspect, a sensing method is provided. The method includes the following operation. The first device transmits target scheduling information to the second device. The target scheduling information is used for determining a presence state of the second device in a DMG sensing measurement. The first device is a sensing initiating device or a sensing by proxy (SBP) device, and the second device is a sensing response device.

In the second aspect, a sensing method is provided. The method includes the following operation. The second device receives target scheduling information sent by the first device. The target scheduling information is used for determining a presence state of the second device in a DMG sensing measurement. The first device is a sensing initiating device or a SBP device, and the second device is a sensing response device.

In the third aspect, a sensing device is provided. The sensing device is configured to perform the method in the above first aspect or implementations thereof.

Specifically, the sensing device includes functional module(s) configured to perform the method in the above first aspect or implementations thereof.

In the fourth aspect, a sensing device is provided. The sensing device is configured to perform the method in the above second aspect or implementations thereof.

Specifically, the sensing device includes functional module(s) configured to perform the method in the above second aspect or implementations thereof.

In the fifth aspect, a sensing device is provided. The sensing device includes a processor and a memory. The memory is configured to store a computer program, and the processor is configured to invoke and execute the computer program stored in the memory to perform the method in the above first aspect or implementations thereof.

In the sixth aspect, a sensing device is provided. The sensing device includes a processor and a memory. The memory is configured to store a computer program, and the processor is configured to invoke and execute the computer program stored in the memory to perform the method in the above second aspect or implementations thereof.

In the seventh aspect, a chip is provided. The chip is configured to implement the method in any one of the above first to second aspects or implementations thereof.

Specifically, the chip includes a processor. The processor is configured to invoke and execute a computer program from a memory to cause a device on which the chip is mounted to perform the method in any one of the above first to second aspects or implementations thereof.

In the eighth aspect, a computer readable storage medium is provided. The computer readable storage medium is used for storing a computer program that causes a computer to perform the method in any one of the above first to second aspects or implementations thereof.

In the ninth aspect, a computer program product is provided. The computer program product includes computer program instructions that cause a computer to perform the method in any one of the above first to second aspects or implementations thereof.

In the tenth aspect, a computer program is provided. When the computer program is executed on a computer, the computer performs the method in any one of the above first to second aspects or implementations thereof.

BRIEF DESCRIPTION OF THE DRAWINGS

FIG. 1 is a schematic diagram of a communication system architecture according to an embodiment of the present disclosure.

FIG. 2 is a schematic diagram of a DMG Sensing Measurement Setup element format.

FIG. 3 is a schematic diagram of a Measurement Setup Control field format.

FIG. 4 is a schematic diagram of a Peer Orientation field format.

FIG. 5 is a schematic diagram of a TX Beam List subelement format or an RX Beam List subelement format.

FIG. 6 is a schematic diagram of a DMG Sensing Scheduling subelement format.

FIG. 7 is a schematic diagram of a Burst Response Delay subelement format.

FIG. 9 is a schematic diagram of a TDD Beamforming Information field format in a DMG Sensing Request frame.

FIG. 13 is a schematic diagram of performing the DMG sensing measurement based on periodic scheduling information according to an embodiment of the present disclosure.

FIG. 15 is a schematic diagram of performing the DMG sensing measurement based on aperiodic scheduling information according to an embodiment of the present disclosure.

FIG. 20 is a schematic format diagram of carrying the first scheduling information through a DMG Sensing Scheduling subelement according to an embodiment of the present disclosure.

FIG. 21 is another schematic format diagram of carrying the first scheduling information through a DMG Sensing Scheduling subelement according to an embodiment of the present disclosure.

FIG. 22 is a schematic format diagram of carrying the first scheduling information through a DMG Sensing Presence Schedule element according to an embodiment of the present disclosure.

FIG. 23 is another schematic format diagram of carrying the first scheduling information through a DMG Sensing Presence Schedule element according to an embodiment of the present disclosure.

FIG. 24 is a schematic format diagram of carrying the second scheduling information through a TDD Beamforming Information field according to an embodiment of the present application.

FIG. 25 is another schematic format diagram of carrying the second scheduling information through a TDD Beamforming Information field according to an embodiment of the present disclosure.

FIG. 26 is a schematic format diagram of carrying the second scheduling information through a Beam Refinement Protocol (BRP) Sensing element according to an embodiment of the present disclosure.

FIG. 27 is another schematic format diagram of carrying the second scheduling information through the BRP Sensing element according to an embodiment of the present disclosure.

FIG. 28 is a schematic format diagram of carrying the third scheduling information through a DMG Sensing Scheduling subelement according to an embodiment of the present disclosure.

FIG. 29 is another schematic format diagram of carrying the third scheduling information through the DMG Sensing Scheduling subelement according to an embodiment of the present disclosure.

DETAILED DESCRIPTION

Figure 8:
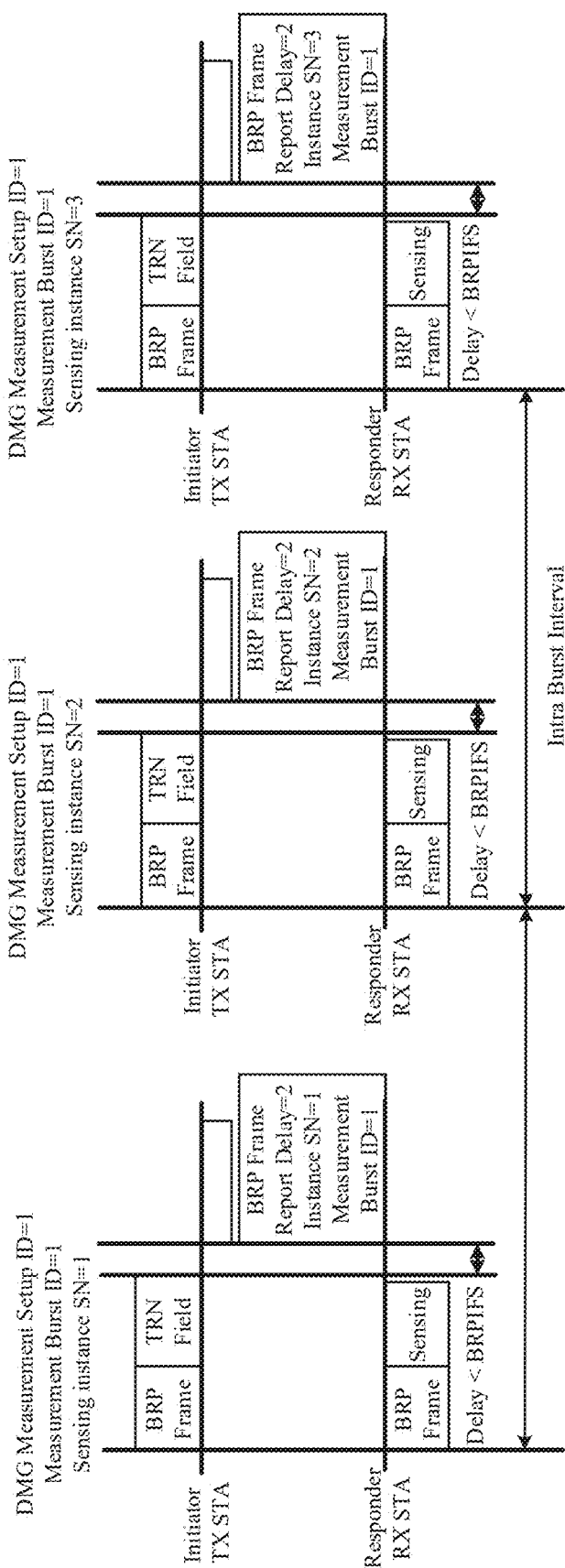
FIG. 8 is a schematic diagram of a bistatic DMG sensing Burst format.

The present disclosure provides a sensing method and a sensing device, so that a presence scheduling of sensing response device(s) in the DMG sensing measurement can be implemented. According to the technical solutions of the aspects of the present disclosure, the sensing initiating device or the SBP device can realize the presence scheduling of the sensing response device(s) in the DMG sensing measurement through the target scheduling information, which is beneficial to reduce the power consumption of the sensing response device(s).

Hereinafter, the technical solutions in the embodiments of the present disclosure will be described with reference to the accompanying drawings in the embodiments of the present disclosure. It is apparent that the described embodiments are part of the embodiments of the present disclosure, but not all the embodiments. Regarding the embodiments in the present disclosure, all other embodiments obtained by those skilled in the art without creative work fall within the scope of protection of the present disclosure.

The technical solutions of the embodiments of the present disclosure may be applied to various communication systems, such as a Wireless Local Area Networks (WLAN), a Wireless Fidelity (WiFi), other communication systems, and the like.

Exemplarily, a communication system 100 to which the embodiments of the present disclosure are applied is illustrated in FIG. 1. The communication system 100 may include an Access Point (AP) 110, and a STATION (STA) 120 that accesses the network through the Access Point 110.

In some scenarios, the AP is also referred to as an AP STA, that is, the AP is also a kind of a STA in a scenario.

In some scenarios, the STA is also referred to as a non-AP STA.

The communication in the communication system 100 may be a communication between an AP and a non-AP STA, a communication between a non-AP STA and a non-AP STA, or a communication between an STA and a peer STA. The peer STA may refer to a device that communicates peer to peer with the STA, for example, the peer STA may be an AP or a non-AP STA.

The AP is equivalent to a bridge connecting wired network and wireless network. The main function of the AP is to connect various wireless network clients together, and then connect the wireless network to Ethernet. The AP device may be a network device (such as a router) or a terminal device (such as a mobile phone) with a WiFi chip.

It should be understood that the role of the STA in the communication system is not absolute. For example, in some scenarios, when the mobile phone is connected the router, the mobile phone is a non-AP STA, and when the mobile phone provides a hotspot for other mobile phones, the mobile phone is an AP.

The AP and non-AP STA may be devices used in the Internet of Vehicles, Internet Of Things (IoT) nodes, sensors, etc. in the IoT, smart cameras, smart remote controllers, smart water meters, etc. in smart homes, and sensors in smart cities, etc.

In some embodiments, the non-AP STA may support the 802.11be standard. The non-AP STA may support various current and future wireless local area networks (WLAN) standards in the 802.11 family, such as 802.11ax, 802.11ac, 802.11n, 802.11 g, 802.11b, and 802.11a.

In some embodiments, the AP may be a device supporting the 802.11be standard. The AP may be a device supporting various current and future WLAN standards in the 802.11 family, such as 802.11ax, 802.11ac, 802.11n, 802.11 g, 802.11b, and 802.11a.

In the embodiments of the present disclosure, the STA may be a device supporting the WLAN or WiFi technology, such as a Mobile Phone, a tablet (Pad), a computer, a Virtual Reality (VR) device, an Augmented Reality (AR) device, a wireless device in industrial control, a set-top box, a wireless device in self driving, an in-vehicle communication device, a wireless device in remote medical, a wireless device in a smart grid, a wireless device in transportation safety, a wireless device in a smart city or a smart home, a wireless communication chip/ASIC/SOC/etc.

The frequency bands supportable by the WLAN technology may include, but are not limited to, low frequency bands (for example, 2.4 GHZ, 5 GHZ, 6 GHZ), or high frequency bands (for example, 60 GHz).

FIG. 1 exemplarily illustrates one AP STA and two non-AP STAs. Alternatively, the communication system 100 may include multiple AP STAs and another number of non-AP STAs, which are not limited by the embodiments of the present disclosure.

It should be understood that a device having a communication function in the network/system in the embodiments of the present disclosure may be referred to as a communication device. Taking the communication system 100 illustrated in FIG. 1 as an example, the communication device may include an AP 110 and a STA 120 that have a communication function, and the AP 110 and the STA 120 may be specific devices described above, which will not be repeated herein. The communication device may further include other devices in the communication system 100, such as other network entities such as network controllers and gateways, which are not limited in the embodiments of the present disclosure.

It should be understood that the terms "system" and "network" are often used interchangeably herein. Herein, the term "and/or" is only used for describing an association relationship of associated objects, and means that there may be three relationships, for example, A and/or B, which may mean that A exists alone, A and B simultaneously exist, and B exists alone. In addition, herein, the character "/" generally indicates that there is an "or" relationship between the associated objects.

It should be understood that the "indication" mentioned in the embodiments of the present disclosure may be a direct indication, an indirect indication, or is used for representing an association relationship. For example, A indicates B, which may mean that A directly indicates B, for example, B may be acquired by A. It may also be indicated that A indicates B indirectly, for example, A indicates C, and B may be acquired through C. It may also be indicated that there is an association relationship between A and B.

In the description of the embodiments of the present disclosure, the term "correspondence" may indicate that there is a direct correspondence or indirect correspondence relationship between the two objects, may indicate that there is an association relationship between the two objects, or may indicate a relationship between indicating and being instructed, configuring and being configured, or the like.

In the embodiments of the present disclosure, "predefined" may be realized by storing corresponding codes, tables, or other methods that may be used to indicate relevant information in advance in devices (for example, including an AP and an STA), and the specific implementations thereof are not limited in present disclosure. For example, "predefined" may refer to be defined in the protocol.

In order to facilitate understanding of the technical solutions of the embodiments of the present disclosure, terms related to the present disclosure will be described below.

An Association Identifier (AID) is used to identify a terminal after establishing association with the AP.

A Media Access Control (MAC) is the abbreviation of an MAC address.

A Transmission Opportunity (TXOP) refers to a period of time during which the terminal with the TXOP may actively initiate one or more transmissions.

A Burst generally refers to a short period of time during which one or more signals are transmitted.

A Burst Group refers to a combination of one or more bursts. The bursts in the same burst group generally have some common features.

In order to facilitate understanding of the technical solutions of the embodiments of the present disclosure, a DMG Sensing Measurement Setup element related to the present disclosure will be described below.

In some scenarios, the DMG Sensing Measurement Setup element is defined during the DMG measurement setup phase, and is used for carrying setup information related to the DMG sensing measurement. FIG. 2 is a schematic diagram of the DMG Sensing Measurement Setup element format. As illustrated in FIG. 2, the DMG Sensing Measurement Setup element may include the following fields: Element ID, Length, Element ID Extension, Measurement Setup Control, Report Type, Location configuration information (LCI), Peer Orientation, Optional Subelements.

The Measurement Setup Control field is used for indicating a type of sensing and controlling whether optional fields exist. FIG. 3 illustrates a schematic diagram of a Measurement Setup Control field format. The Sensing Type field indicates the type of sensing as shown in Table 1.

TABLE 1

| Value | Description |
| --- | --- |
| 0 | Coordinated Monostatic |
| 1 | Coordinated Bistatic |
| 2 | Bistatic |
| 3 | Multistatic |
| 4-7 | Reserve |

The Rx Initiator field indicates a role of a Sensing Initiator. For example, the value of this field being 1 indicates that the Sensing Initiator is a Sensing Receiver, and the value of this field being 0 indicates that the Sensing Initiator is a Sensing Transmitter. If the type of sensing is not the Bistatic type, this field is reserved.

The LCI Present field indicates whether the LCI field exists. For example, the value of this field being 1 indicates that the DMG Sensing Measurement Setup element includes the LCI field, and the value of this field being 0 indicates that the DMG Sensing Measurement Setup element does not include the LCI field.

The Orientation Present field indicates whether the Peer Orientation field exists. For example, the value of this field being 1 indicates that the DMG Sensing Measurement Setup element includes the Peer Orientation field, and the value of this field being 0 indicates that the DMG Sensing Measurement Setup element does not include the Peer Orientation field.

When the Service Period (SP) field is set to 1, it is indicated that the Extended Schedule element is being used, otherwise it is set to 0.

The Report Type field indicates the type of report that the Sensing Initiator expects to obtain from the Sensing Responder. The values of the Report Type field and meanings corresponding to the values are shown in Table 2.

TABLE 2

| Value | Interpretation |
| --- | --- |
| 0 | No report |
| 1 | Channel State Information (CSI) |
| 2 | DMG Sensing Image Direction |
| 3 | DMG Sensing Image Range-Doppler |
| 4 | DMG Sensing Image Range-Direction |
| 5 | DMG Sensing Image Doppler-Direction |
| 6 | DMG Sensing Image Range-Doppler Direction |
| 7 | Target |
| 8-255 | Reserved |

The LCI field (optional) is used for carrying location information of itself.

The Peer Orientation field contains an azimuth, an elevation and a range, measuring by the STA, of the peer STA. FIG. 4 is a schematic format diagram of a Peer Orientation field. The Azimuth field, the Elevation field, and the range field respectively indicate the azimuth, the elevation, and the range obtained by the STA performing measurement on the peer STA.

The Optional Subelements field contains zero or multiple subelements. The definition of Subelements is shown in Table 3.

TABLE 3

| Subelement ID | Subelement Name | Extensible |
| --- | --- | --- |
| 1 | TX Beam List | Yes |
| 2 | RX Beam List | Yes |
| 3 | DMG Sensing Scheduling | Yes |
| 4 | Burst Response Delay | Yes |
| 5-255 | Reserved | No |

The DMG Sensing Scheduling subelement includes scheduling information for measurement defined in the measurement setup. The TX Beam List subelement includes a list of indexes of transmission beams. The RX Beam List subelement includes a list of indexes of reception beams. The TX Beam List subelement format and the RX Beam List subelement format are illustrated in FIG. 5. The Number Beam Indices field represents the number of Beam Indexes. The Beam Index field is used to indicate the beam index. The length of each Beam Index field is 12 bits.

The DMG Sensing Scheduling suelement includes scheduling information for measurement negotiated during the measurement setup phase. FIG. 6 is a schematic diagram of the DMG Sensing Scheduling suelement format. The Start of Burst field includes the start time of the first burst, in a unit of Timing Synchronization Function (TSF), and the value of being 0 indicates that the start time of the first burst is not clarified.

The Inter Burst Interval field includes the time interval between the starts of consecutive bursts, in a unit of TSF, and the value being 0 indicates that the time interval between the starts of consecutive bursts is not clarified.

The Intra Burst Interval field includes the time interval between the starts of consecutive instances, in a unit of TSF, and the value being 0 indicates that the time interval between the starts of consecutive instances is not clarified.

The Number TX beams Per Instance field includes the number of TX beams used for an instance.

The Repeat Per Instance field indicates the number of the repetition transmissions.

The Number Bursts field includes the number of burst repetitions, and the value being 0 refers to repeating the burst until another measurement set or stop.

The Number of Instances per Burst field includes the number of repetitions of instances in a burst, and the value being 0 indicates that the number of repetitions of instances in a burst is not clarified.

FIG. 7 is a schematic diagram of a Burst Response Delay subelement format. The Burst Response Delay field includes the time (in a unit of millisecond) after the end of the previous Physical Protocol Data Unit (PPDU) in the current Burst. The sensing responder needs said time to generate a report regarding the sensing measurement in the Burst.

The DMG Sensing Beam Description element may be carried in at least one of the following frames: Beacon frame, Probe Request frame, Probe Response frame, Association Request frame, Association Response frame, Reassociation Request frame, Reassociation Response frame, Measurement Setup Query.

In order to facilitate understanding of the technical solutions of the embodiments of the present disclosure, a DMG Sensing Burst related to the present disclosure will be described.

A DMG Sensing Burst may be composed of one or more DMG Sensing instances, starting from the first DMG Sensing instance and ending with the last DMG Sensing instance. The parameters intra-burst interval and inter-burst interval are used to define the features of each DMG Sensing Burst. The parameter intra-burst interval defines the time interval between the starts of two consecutive instances belonging to the same Burst, and the parameter inter-Burst interval defines the time interval between the starts of two consecutive Bursts.

Each DMG Sensing Burst is identified by a unique parameter Measurement Burst ID, which identifies a parameter negotiated during the DMG sensing measurement setup phase. All DMG Sensing instances in the DMG Sensing Burst belong to the same Measurement Burst ID. If a parameter related to reporting delay is negotiated during the DMG sensing measurement setup phase, the sensing responder may aggregate the reports and report once per Burst.

The DMG Sensing instance is limited by a TXOP or a SP. The SP should be used when the value of the SP subfield in the Measurement Setup Control field in the DMG Sensing Measurement Setup element is 1, otherwise the SP should not be used.

The DMG sensing instance phase includes an initialization phase, a sounding phase, and a reporting phase. The sounding phase is necessary, and the initialization phase and the reporting phase are optional. The Coordinated Monostatic sensing, Coordinated Bistatic sensing and Multistatic sensing include the initialization phase. When the sensing responder is a sensing receiver, the reporting phase is necessary. Each DMG Sensing instance is identified with a Sensing Instance Sequence Number (SN). The Sensing Instance SNs gradually ascends in a burst identified by each Measurement burst ID, and the Sensing Instance SN is unique within the specified range.

Hereinafter, several types of sensing examples will be specifically described.

A. Coordinated Monostatic Sensing Instance

The Coordinated Monostatic sensing instance is initiated by a DMG sensing request, and is responded by a DMG sensing response. Then it is followed by a sounding phase in which a Monostatic PPDU is transmitted and received by a sensing responder. The entire DMG sensing measurement process covers several transmit antenna weight vectors (TX AWVs) specified by the Number TX Beam Per Instance field. The Number TX Beam Per Instance field is defined in the DMG Sensing Scheduling subelement in the DMG Sensing Measurement Setup element. The sensing initiator should determine the parameters for transmitting and receiving Monostatic PPDU, and the parameters should match the capability of the sensing responder and cover all beams, expected to be transmitted, specified in the TX Beam List subelement. The first beam for transmitting and receiving the Monostatic PPDU used by the sensing responder in the DMG sensing instance is specified by a First Beam Index field. The sensing responder cyclically transmits and receives Monostatic PPDUs through the number of beams indicated in the Num TX Beams Per Instance field. If the Repeat Per instance field (NRI) in the DMG Sensing Scheduling subelement is greater than 1, the sensing responder will repeat Num TX beams Per Instance Beams for NRI times in the DMG sensing instance. All Monostatic PPDUs transmitted and received by the sensing responder should be separated by a short beamforming interframe space (SBIFS). If a sensing report is generated in a DMG sensing instance, the sensing responder should submit the report within a Short interframe space (SIFS) time after the previous Monostatic PPDU, or wait for polling of the sensing initiator. The sensing report may be generated based on a channel measurement feedback element or a DMG sensing report element. The type of the report and whether the report exists are determined by the DMG Sensing Report field in the DMG Sensing Report Control element.

The initialization of the Coordinated Monostatic DMG sensing instance needs to follow the following rules.

The number of sensing responders in each Coordinated Monostatic DMG sensing instance with the same DMG Measurement Setup ID may be different.

The sensing initiator should transmit a DMG Sensing Request frame to each sensing responder to request presence in Coordinated Monostatic DMG sensing instance.

The sensing responder should respond to the sensing initiator within the SIFS time with the DMG Sensing Response frame.

The sensing responder responding to the sensing initiator should continue the presence in Monostatic sensing.

The order of sounding is indicated by the STA ID field in the DMG Sensing Request frame, and the order of sounding may be sequentially performed by multiple devices or synchronously performed by multiple devices.

The sensing initiator may set the Updated TX Beam List field in the Time Division Duplex (TDD) Beamforming Information field through the DMG Sensing Request frame to update the transmission beam allocated to the sensing responder in the DMG Sensing Measurement Setup Request frame.

In the sounding phase, the Receiver Address (RA) in the Physical Protocol Service Unit (PPSU) included in the PPDU should equal to the Transmitter Address (TA).

In the reporting phase, in the case of Coordinated Monostatic sensing in serial mode, each sensing responder should transmit a DMG Sensing Measurement Report frame within the SIFS time after the Monostatic PPDU. In the case of Coordinated Monostatic sensing in parallel mode, each sensing responder should respond within the SIFS time after receiving the DMG Sensing Poll frame.

B. Coordinated Bistatic Sensing Instance

The Coordinated Bistatic DMG sensing instance is initiated by a group of DMG sensing instance requests and is responded by a DMG sensing response, and then a group of DMG Bistatic sensing instances is performed.

Coordinated Bistatic DMG sensing instances need to follow the following rules.

The number of sensing responders in Coordinated Bistatic DMG sensing instances with the same DMG Measurement Setup ID may be different.

The sensing initiator should transmit a DMG Sensing Request frame to each sensing responder to invite the sensing responder to presence in the DMG sensing instance.

The sensing responder should respond to the sensing initiator within SIFS time with the DMG Sensing Response frame.

The sensing responder responding to the sensing initiator should remain active to receive a BRP PPDU.

The order of sounding is indicated by the STA ID field in the DMG Sensing Request frame.

C. Multistatic Sensing Instance

In the initialization phase, a Multistatic enhanced DMG (EDMG) sensing instance between a sensing initiator as a sensing transmitter and multiple sensing responders is initiated through one or more DMG Sensing Request frames, and the DMG Sensing Request frame is responded. The sensing initiator transmits a DMG Sensing Request frame to each desired sensing responder. The values of DMG Measurement Setup ID and values of the Sensing Instance SN field should be the same in all DMG Sensing Request frames. The value of the STA ID set by the sensing initiator should be in a range of 0 to 7, which indicates the index of the sensing responder sync field in the sync field in the EDMG Multistatic Sensing PPDU. The EDMG Multistatic Sensing PPDU should be transmitted to a sensing responder whose STA ID having a value of 0. The sensing initiator sets the value of the First Beam Index field in the Training (TRN) field in the EDMG Multistatic Sensing PPDU to indicate the first transmitted beam.

The STA receiving the DMG Sensing Request frame should respond with the DMG Sensing Response frame within the SIFS time. The sensing responder should remain active in the Multistatic EDMG sensing instance to receive all EDMG Multistatic Sensing PPDUs or polling frames. The sensing initiator should transmit the DMG Sensing Request frame to the next desired sensing responder within the SIFS time after receiving the response from the previous sensing responder.

During the sounding phase, the sensing initiator should start transmitting the EDMG Multistatic Sensing PPDU within the SIFS time after receiving the response from the last sensing responder. The sensing initiator should select the format of the TRN field in each transmitted EDMG Multistatic Sensing PPDU (by setting the transmission vector (TXVECTOR) parameters, such as training sequence length (TRN_SEQ_LENGTH), EDMG training length (EDMG_TRN_LEN), reception training per transmission training (RX_TRN_PER_TX_TRN), EDMG training P (EDMG_TRN_P), EDMG training M (EDMG_TRN_M), EDMG training N (EDMG_TRN_N). The selected format should conform to the capability of the sensing responder and cover all beams that are expected to be transmitted and received. The selected TXVECTOR parameter should match the value in the corresponding field in the DMG Sensing Request frame. All EDMG Multistatic Sensing PPDUs in the Multistatic EDMG sensing instance should have the same PPDU length and TRN field format.

In the reporting phase, the Multistatic EDMG sensing instance may end with the sensing initiator polling the sensing measurement report of each sensing responder. The sensing initiator transmits a DMG Sensing Poll frame to each sensing responder within the SIFS time after transmitting the previous PPDU, and the frame includes a DMG Sensing Report Control element and a DMG Sensing Report element or one or more channel measurement feedback elements.

D. Bistatic Sensing Instance

The Bistatic sensing instance is a DMG sensing instance whose Sensing Type subfield is set to Bistatic. Only a single transmission STA and a single reception STA are presence in the Bistatic DMG sensing instance. The roles of the sensing initiator and sensing responder (i.e., sensing transmitter or sensing receiver) are determined by the RX Initiator field in the Measurement Setup Control field in the DMG Sensing Measurement Setup element transmitted by the sensing initiator. The role applies to all DMG sensing instances for the same DMG sensing measurement setup.

The Bistatic DMG sensing instance that the sensing initiator is a sensing transmitter consists of one or more BRP frames containing TRN fields, and the sensing responder responds to the BRP frame after the sensing initiator transmits the frame with BRPIFS delay. The measurement covers the number of transmission AWV combinations indicated by the TX beam number field for each instance in the DMG Sensing Scheduling subelement of the DMG sensing measurement setup element. The covered beams start at the First Beam Index specified in the BRP sensing element and continue to the remaining beams in the Tx Beam List subelement. All AWV combinations are indicated in the RX Beam List covered by the sensing responder.

The sensing initiator should determine the format of the TRN field in each transmitted BRP frame (by setting the TXVECTOR parameters: TRN_SEQ_LENGTH, EDMG_TRN_LEN, RX_TRN_PER_TX_TRN, EDMG_TRN_P, EDMG_TRN_M, EDMG_TRN_N) to be compatible with the capabilities of all devices and to cover all desired TX and RX beams. For example, if the number of RX beams is small, a BRP RX/TX PPDU may be used. If the number of RX beams is large, one BRP RX PPDU is used for each TX beam. If there is a single RX beam, the BRP TX PPDU may be used, and several TX beams are covered. If the sensing initiator or sensing responder is a non-EDMG STA, or if the sensing responder has set the DMG TRN RX Only Capable field in the Beamforming Capability suelement in the EDMG Capabilities element to 1, the sensing initiator should use the BRP-RX PPDU, except that the number of RX beams is 1, and in this case the BRP-TX PPDU will be used. In each BRP frame, the First Beam Index field refers to the first beam used by the TRN field in the PPDU. The sensing initiator configures the number of TX beams through Num TX Beams Per Instance. If the Repeat per Instance field (NRI) in the DMG Sensing Scheduling subelement is greater than 1, the sensing initiator should cover Num TX Beams Per Instance number of TX beams NRI times in the instance. All BRP frames sent by the sensing initiator are separated by the SIFS. The sensing responder should respond with the BRP frame carrying the report after the BRPIFS. The report may be based on a Channel Measurement Feedback element or a DMG Sensing Report element. Whether the report exists and the type of the report are indicated by the Report Control field in the DMG Sensing Report Element.

When the sensing initiator is a sensing receiver, the Bistatic DMG sensing instance consists of one BRP frame. The sensing responder responds with one or more BRP frames including the TRN fields after the sensing initiator transmits the BRP frame with the BRPIFS delay. The first transmission beam used by the sensing responder is specified by the First Beam Index field in the BRP Sensing element of the BRP frame transmitted by the sensing initiator. The sensing responder uses this beam to start transmission. The number of TX beams that the sensing responder should consistently use is determined by the Num TX Beams Per Instance field in the DMG Sensing Scheduling suelement in the DMG Sensing Measurement Setup element. For these beams, the sensing initiator may be allowed to traverse all beams in the RxBeamList. This method allows that the combination of transmission/reception beams is the same as the case of the sensing initiator being a transmitter. The BRP frame of the sensing responder is separated by using SIFS. In the Bistatic DMG sensing instance, when the sensing initiator is a sensing receiver, the report is not required.

FIG. 8 illustrates a schematic diagram of a Bistatic DMG sensing Burst. In the example, three are sensing instances determined by the numbered sensing instance SNs. In each DMG sensing instance, the sensing initiator transmits a BRP frame including a TRN field in a BRP PPDU. In each DMG sensing instance, the sensing responder responds with one BRP frame. When the sensing responder is not ready to provide a response report immediately, in each DMG sensing instance subsequent to the first DMG sensing instance, the report is related to the preceding instance, and there is no report in the first DMG sensing instance.

In order to facilitate understanding of the technical solutions of the embodiments of the present disclosure, frames related to DMG sensing in the present disclosure will be described.

1. DMG Sensing Request Frame

In the Coordinated Monostatic sensing, Coordinated Bistatic sensing, and Multistatic sensing, the sensing initiator needs to transmit a DMG Sensing Request to each sensing responder to request the sensing responder to be presence in the DMG sensing instance. FIG. 9 illustrates a TDD Beamforming Information field format in the DMG Sensing Request frame. The DMG Measurement Setup ID field, Measurement Burst ID field, and Sensing Instance SN field respectively identify the DMG Measurement setup, DMG sensing burst, and DMG sensing instance. The Sensing Type field indicates the requested DMG sensing type. The DMG sensing type indicated by the Sensing Type field is shown in Table 4:

TABLE 4

| Value | Description |
|---|---|
| 0 | Coordinated Monostatic |
| 1 | Coordinated Bistatic |
| 2 | Multistatic |
| 3-7 | Reserved |

The STA ID field represents the index of the reception STA synch field in the EDMG Multistatic Sensing PPDU.

The First Beam Index field is an index of the Tx beam list in the DMG Sensing Measurement Setup element. It indicates the first beam that will be used for the DMG sensing instance.

The Num of STAs in Instance field indicates the number of STAs that are presence in the DMG sensing instance.

The Num of PPDU in Instance field indicates the number of DMG Multistatic sensing PPDUs that exist in the DMG sensing instance.

EDMG TRN Length field, RX TRN-Units per Each TX TRN-Unit field, EDMG TRN-Unit P field, EDMG TRN-Unit M field, EDMG TRN-Unit N field, TRN Subfield Sequence Length, BW field, Sense Multiple Golays field, and Sense Golay Index field include the values of the corresponding header fields in the EDMG Multistatic sensing PPDU. These fields are retained when the sensing type is Coordinated Monostatic sensing.

The Monostatic Sounding Mode field indicates whether the Coordinated Monostatic sounding phase is parallel sensing or serial sensing. For example, the value being 1 indicates the serial sensing, and the value being 0 indicates the parallel sensing. This field is retained when the sensing type is not the Coordinated Monostatic sensing.

The Num of TX Beams in Instance field, Num of Repeat in Instance field and the Updated TX Beam List field exist when the sensing type is the Coordinated Monostatic sensing, otherwise do not exist.

The Num of TX Beams in Instance field indicates the number of TX Beams used in the next sensing instance. The Num of TX Beams in Instance field in the last sensing instance in a Burst indicates number of TX Beam pairs in the first sensing instance in the next burst. This field is retained in the last sensing instance in the last Burst.

The Num of Repeat in Instance subfield indicates the number of repetition transmissions in the next sensing instance. The Num of Repeat in Instance field in the last sensing instance in a Burst indicates the number of repetition transmissions in the first sensing instance in the next Burst. This field is retained in the last sensing instance in the last Burst.

Figure 10:
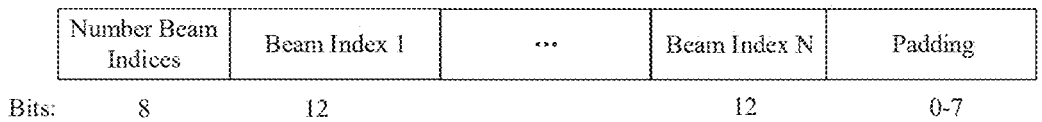
FIG. 10 is a schematic diagram of an Updated TX Beam List field format.

The Updated TX Beam List field includes a series of transmission beam indices. The beam index represents the index of the Beam Descriptors list in the DMG Sensing Beam Descriptor element that the TX Flag field is set to 1. The definition of the Updated TX Beam List field is illustrated in FIG. 10. When the Number Beam Indices field is 0, it indicates that no Beam Index field exists.

2. DMG Sensing Response Frame

Figure 11:
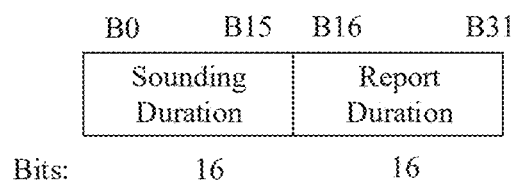
FIG. 11 is a schematic diagram of a TDD Beamforming Information field format in a DMG Sensing Response frame.

When the sensing type in the DMG Sensing Request frame is Coordinated Monostatic sensing, the TDD Beamforming Information field format in the DMG Sensing Response frame is illustrated in FIG. 11, otherwise, the TDD Beamforming Information field in the DMG Sensing Response frame does not exist. The Sounding Duration field indicates the sounding time of the next DMG sensing instance. This field is in a unit of microsecond, and the value being 0 indicates that the sensing responder will not transmit any sounding PPDU.

The Report Duration field indicates the duration of the report frame transmitted by the sensing responder in the next DMG sensing instance. This field is in a unit of microsecond and the value being 0 indicates that the sensing responder will not transmit any report frame.

3. DMG Sensing Measurement Setup Request Frame

The DMG Sensing Measurement Setup Request frame is an Action frame. It is transmitted by the sensing initiator to request the DMG sensing measurement setup. The definition of the action field of the DMG Sensing Measurement Setup Request frame is shown in Table 5.

TABLE 5

| order | Information |
|---|---|
| 1 | Category |
| 2 | Unprotected DMG Action |
| 3 | Dialog Token |
| 4 | DMG Measurement Setup ID |
| 5 | DMG Sensing Measurement Setup element |

4. DMG Sensing Measurement Setup Response Frame

The DMG Sensing Measurement Setup Response frame is an Action frame, and it is sent by the sensing responder to response to the DMG Sensing Measurement Setup Request frame. The definition of the Action field of the DMG Sensing Measurement Setup Response frame is shown in Table 6.

TABLE 6

| order | Information |
|---|---|
| 1 | Category |
| 2 | Unprotected DMG Action |
| 3 | Dialog Token |
| 4 | DMG Measurement Setup ID |
| 5 | Status Code |
| 6 | DMG Sensing Measurement Setup element |
| 7 | DMG Sensing Image Range Axis LUT |
| 8 | DMG Sensing Image Doppler Axis LUT |
| 9 | DMG Sensing Instance Duration element |

5. DMG Sensing Sensing by Proxy (SBP) Request Frame.

The DMG Sensing SBP Request frame is an Action frame, and it is sent by the SBP initiator to request the proxy for DMG SBP flow. The definition of the action field of the DMG Sensing SBP Request frame is shown in Table 7.

TABLE 7

| order | Information |
|---|---|
| 1 | Category |
| 2 | Unprotected DMG Action |
| 3 | Dialog Token |
| 4 | DMG Sensing Measurement Setup element |
| 5 | DMG SBP Parameters element |

The DMG Sensing SBP Response frame is an Action frame, and it is sent by an SBP responder to response to a DMG Sensing SBP Request frame. The definition of the action field of the DMG Sensing SBP Response frame is shown in Table 8.

6. DMG Sensing SBP Response Frame.

TABLE 8

| order | Information |
|---|---|
| 1 | Category |
| 2 | Unprotected DMG Action |
| 3 | Dialog Token |
| 4 | DMG Measurement Setup ID |
| 5 | Status Code |
| 6 | DMG SBP Parameters element |
| 7 | DMG Sensing Measurement Setup element |
| 8 | DMG Sensing Image Range Axis LUT |
| 9 | DMG Sensing Image Doppler Axis LUT |

7. Protected DMG Sensing Measurement Setup Request Frame

The Protected DMG Sensing Measurement Setup Request frame is an Action frame, and it is sent by the sensing initiator to request the DMG sensing measurement setup. The definition of the action field of the Protected DMG Sensing Measurement Setup Request frame is shown in Table 9.

TABLE 9

| Order | Information |
|---|---|
| 1 | Category |
| 2 | DMG Action |
| 3 | Dialog Token |
| 4 | DMG Measuring Setup ID |
| 5 | DMG Sensing Measuring Setup element |

8. Protected DMG Sensing Measurement Setup Response Frame

The Protected DMG Sensing Measurement Setup Response frame is an Action frame, and it is sent by the sensing responder to response to the Protected DMG Sensing Measurement Setup Request frame. The definition of the Action field of the Protected DMG Sensing Measurement Setup Response frame is shown in Table 10.

TABLE 10

| order | Information |
|---|---|
| 1 | Category |
| 2 | DMG Action |
| 3 | Dialog Token |
| 4 | DMG Measuring Setup ID |
| 5 | Status Code |
| 6 | DMG Sensing Measuring Setup element |
| 7 | DMG Sensing Image Range Axis LUT |
| 8 | DMG Sensing Image Doppler Axis LUT |
| 9 | DMG Sensing Instance Duration element |

9. Protected DMG Sensing SBP Request Frame

The Protected DMG Sensing SBP Request frame is an Action frame, and it is sent by the SBP initiator to request a DMG SBP flow. The definition of the action field of the Protected DMG Sensing SBP Request frame is shown in Table 11.

TABLE 11

| Order | Information |
|---|---|
| 1 | Category |
| 2 | DMG Action |
| 3 | Dialog Token |
| 4 | DMG Sensing Measuring Setup element |
| 5 | DMG SBP Parameters element |

10. Protected DMG Sensing SBP Response Frame

The Protected DMG Sensing SBP Response frame is an Action frame, and it is sent by an SBP responder to response to a Protected DMG Sensing SBP Request frame. The definition of the action field of the Protected DMG Sensing SBP Response frame is shown in Table 12.

TABLE 12

| order | Information |
|---|---|
| 1 | Category |
| 2 | DMG Action |
| 3 | Dialog Token |
| 4 | DMG Measuring Setup ID |
| 5 | Status Code |
| 6 | DMG SBP Parameters element |
| 7 | DMG Sensing Measuring Setup element |
| 8 | DMG Sensing Image Range Axis LUT |
| 9 | DMG Sensing Image Doppler Axis LUT |

To sum up, the sensing responder can perform DMG sensing measurement based on the parameter negotiated in the DMG sensing measurement setup phase. However, this mechanism is not conducive to the power save of the sensing responder. Therefore, it is needed to design a power save mechanism in DMG sensing measurement.

In order to facilitate understanding of the technical solutions of the embodiments of the present disclosure, the technical solutions of the present disclosure will be described in detail below with reference to specific examples. The following related technologies may be arbitrarily combined with the technical solutions of the embodiments of the present disclosure as optional solutions, and all of them belong to the scope of protection of the embodiments of the present disclosure. Embodiments of the present disclosure include at least some of the following.

Figure 12:
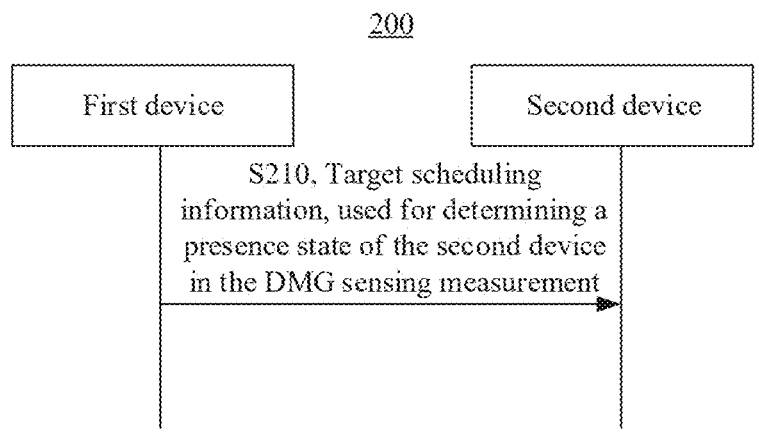
FIG. 12 is a schematic diagram of the interaction in a sensing method according to an embodiment of the present disclosure.

FIG. 12 is a schematic diagram of the interaction in a sensing method 200 according to an embodiment of the present disclosure. As illustrated in FIG. 12, the method 200 includes the following contents.

In operation S210, the first device transmits target scheduling information to the second device. The target scheduling information is used for determining a presence state of the second device in the DMG sensing measurement.

Correspondingly, the second device receives the target scheduling information.

In some embodiments, the first device is a sensing initiating device and the second device is a sensing response device.

In other embodiments, the first device is a SBP device and the second device is a sensing response device.

That is, the sensing method provided in the embodiments of the present disclosure may be applied to a DMG sensing process automatically initiated by the sensing initiating device, or may be applied to a DMG sensing process initiated by the SBP device.

In some embodiments, the sensing initiating device may be an AP device, or may also be a STA device.

In some embodiments, the sensing response device may be a STA device.

In some embodiments, the SBP device may be an AP device. For example, when the sensing initiating device is a STA device, the AP device may act as a proxy for the STA device to initiate a DMG sensing process.

In the embodiments of the present disclosure, the sensing initiating device is referred to as a sensing initiator, and the sensing response device is referred to as a sensing responder.

In some embodiments, the sensing method provided by the embodiments of the present disclosure may be applied to multi-device sensing scenarios, such as DMG Bistatic sensing, DMG Coordinated Monostatic sensing, DMG Coordinated Bistatic sensing, DMG Multistatic sensing, and the like.

In some embodiments, the presence state of the second device in the DMG sensing measurement may refer to the presence state of the second device in the DMG sensing measurement process. For example, a presence state of the second device in a DMG sensing instance, or a presence state of the second device in a DMG sensing burst. That is, the target scheduling information may be used for determining the presence state of the second device in the DMG sensing instance, or the presence state of the second device in the DMG sensing burst.

In some embodiments, the presence state of the second device in the DMG sensing measurement may include whether the second device presents in the DMG sensing measurement. For example, whether the second device presents in particular one or more DMG sensing instances, or whether the second device presents in particular one or more DMG sensing bursts.

In the embodiments of the present disclosure, the target scheduling information may be referred to as Presence Schedule information and/or Absence Schedule information. For example, the target scheduling information may be used for indicating information of DMG sensing units with consecutive presence of the second device, and/or information of DMG sensing units with consecutive absence of the second device.

In some embodiments, the DMG sensing unit may be a sensing measurement unit such as a DMG sensing Instance or a DMG sensing Burst.

It should be noted that, in the embodiments of the present disclosure, the absence schedule of the sensing response device may mean that the sensing response device does not need to present in certain DMG sensing instances or DMG sensing bursts in the DMG sensing process, and in this case, the sensing response device may perform any other allowed operations, such as transmitting and receiving frames related to communication, entering a power saving mode, or entering a doze state, etc.

In the embodiments of the present disclosure, the target scheduling information may explicitly indicate the scheduling information of the second device, for example, the target scheduling information may include periodic scheduling information, or may include aperiodic scheduling information (for example, temporary scheduling information), or the target scheduling information may implicitly indicate the scheduling information of the second device. The specific indication manner of the target scheduling information is not limited in the present disclosure.

Although the specific implementation of the target scheduling information will be described in the following specific embodiments, the present disclosure is not limited thereto.

In some embodiments of the present disclosure, the target scheduling information includes, but is not limited to, at least one of: the first scheduling information being periodic scheduling information, the Second scheduling information being aperiodic scheduling information, or the third scheduling information (i.e., implicit scheduling information) for determining a maximum initialization time of a DMG sensing instance.

It should be understood that the first scheduling information, the second scheduling information, and the third scheduling information may be transmitted by the same frame, or may be transmitted by different frames, which is not limited in the present disclosure.

Hereinafter, the first scheduling information, the second scheduling information, and the third scheduling information will be described, respectively.

Embodiment 1: First Scheduling Information

In some embodiments, the first scheduling information may be scheduling information in a unit of DMG sensing measurement setup.

For example, the first scheduling information is applicable to all DMG sensing instances or all DMG sensing bursts in the DMG sensing measurement setup. That is, the presence states of the second device in all DMG sensing instances or all DMG sensing bursts in the DMG sensing measurement setup may be determined according to the first scheduling information.

Example 1-1

In some embodiments, the first scheduling information is used for indicating at least one of: the number of DMG sensing units with consecutive presence of the second device, the number of DMG sensing units with consecutive absence of the second device, a unit of the DMG sensing units, or a presence state of the second device in the first DMG sensing unit.

In some embodiments, the number of DMG sensing units with consecutive presence of the second device is denoted as the first number N1, the number of DMG sensing units with consecutive absence of the second device is denoted as the second number N2, and a sum of the first number and the second number may be considered as cycle information of the first scheduling information, or may be considered as scheduling cycle information of the presence state. That is, in the scheduling cycle, the number of DMG sensing units with consecutive presence of the second device is the first number, and the number of DMG sensing units with consecutive absence of the second device is the second number.

In some embodiments, the unit of the DMG sensing units may be DMG sensing instance or DMG sensing burst.

That is, the scheduling cycle of the presence state may be (N1+N2) DMG sensing instances, or (N1+N2) DMG sensing bursts.

In some embodiments, the first scheduling information may indicate a presence state of the second device in the first DMG sensing unit. Here, the first DMG sensing unit may refer to the first DMG sensing unit in one scheduling cycle. Alternatively, the first scheduling information may not indicate the presence state of the second device in the first DMG sensing unit. In this case, the presence of the second device in the first DMG sensing unit may be default, or the absence of the second device in the first DMG sensing unit may be default.

In some embodiments, when the first scheduling information does not indicate the number of DMG sensing units with consecutive presence of the second device, the number may be a default value, or a predefined value, for example, the default value is 1 or 2, etc.

In some embodiments, when the first scheduling information does not indicate the number of DMG sensing units with consecutive absence of the second device, the number may be a default value, or a predefined value, for example, the default value is 0, 1, or 2, etc.

In some embodiments, when the first scheduling information does not indicate the unit of the DMG sensing units, the DMG sensing unit is a default unit, for example, the default unit is a DMG sensing instance or a DMG sensing burst.

Examples 1-2

In other embodiments, the first scheduling information is used for indicating at least one of the following information: scheduling cycle information of the presence state, the number (which is denoted as the third number) of DMG sensing units with consecutive presence or absence of the second device in a cycle, a unit of the DMG sensing units, or a presence state of the second device in a first DMG sensing unit.

In Embodiment 1-2, the first scheduling information may directly indicate a scheduling cycle of the presence state and the number of DMG sensing units with consecutive presence or absence in a cycle.

In some embodiments, the scheduling cycle information of the presence state may be a default value or a predefined value, for example, the scheduling cycle of the presence state may be, by default, X DMG sensing instances, or Y DMG sensing bursts. X and Y are positive integers greater than 1.

Exemplarily, X is 4 or 6 and Y is 2 or 3, etc.

In some embodiments, when the first scheduling information does not indicate the number of DMG sensing units with consecutive presence or absence of the second device, the number may be a default value, or a predefined value, for example, the default value is 1 or 2, or the like.

In some embodiments, when the first scheduling information does not indicate the unit of the DMG sensing units, the DMG sensing unit is a default unit, for example, the default unit is a DMG sensing instance or a DMG sensing burst.

In some embodiments, the first scheduling information may indicate the presence state of the second device in the first DMG sensing unit. Here, the first DMG sensing unit may refer to the first DMG sensing unit in one scheduling cycle. Alternatively, the first scheduling information may not indicate the presence state of the second device in the first DMG sensing unit. In this case, the presence of the second device in the first DMG sensing unit may be default, or the absence of the second device in the first DMG sensing unit may be default.

Hereinafter, with reference to FIG. 13 to FIG. 14, a specific implementation in which the sensing response devices performs DMG sensing measurement based on periodic scheduling information will be described.

Figure 13:
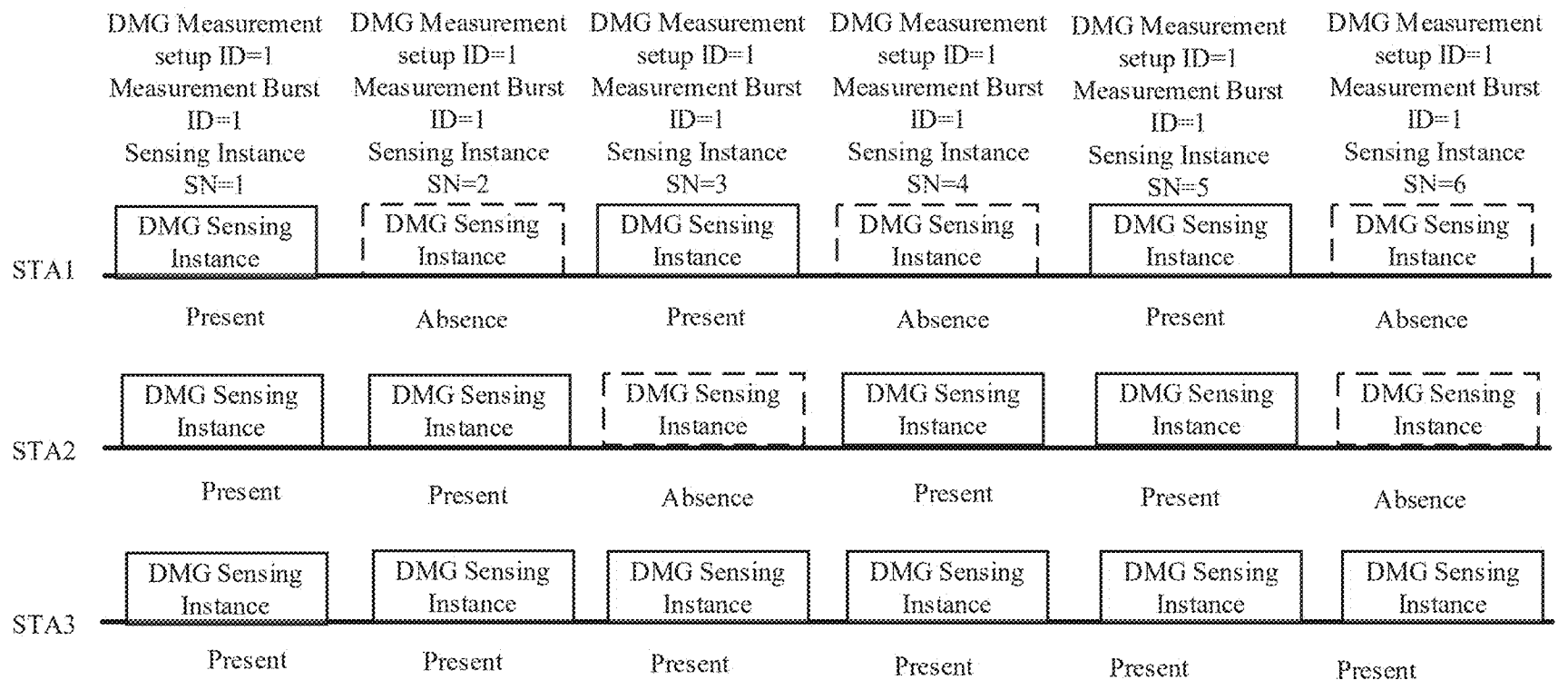

In the example of FIG. 13, the sensing response devices include STA1, STA2, and STA3.

The periodic scheduling information of the STA1 may be as follows.

The DMG sensing unit is a DMG sensing instance, the first number is 1, the second number is 1, and the presence state in the first DMG sensing instance is presence.

Alternatively, the DMG sensing unit is a DMG sensing instance, the scheduling cycle is 2, the third number is 1, and the presence state in the first DMG sensing instance is presence.

That is, the STA1 presents in one DMG sensing instance in every two DMG sensing instances.

The periodic scheduling information of the STA2 may be as follows.

The DMG sensing unit is a DMG sensing instance, the first number is 2, the second number is 1, and the presence state in the first DMG sensing instance is presence.

Alternatively, the DMG sensing unit is a DMG sensing instance, the scheduling cycle is 3, the third number is 2 (indicating the number of DMG sensing instances with consecutive presence) or 1 (indicating the number of DMG sensing instances with consecutive absence), and the presence state in the first DMG sensing instance is presence.

That is, the STA2 presents in two DMG sensing instances in every three DMG sensing instances.

The periodic scheduling information of the STA3 may be as follows.

The DMG sensing unit is a DMG sensing instance, the first number is 3, the second number is 0, and the presence state in the first DMG sensing instance is presence.

Alternatively, the DMG sensing unit is a DMG sensing instance, the scheduling cycle is 3, the third number is 3 (indicating the number of DMG sensing instances with consecutive presence) or 0 (indicating the number of DMG sensing instances with consecutive absence), and the presence state of the STA3 in the first DMG sensing instance is presence.

That is, the STA3 presents in all DMG sensing instances.

Figure 14:
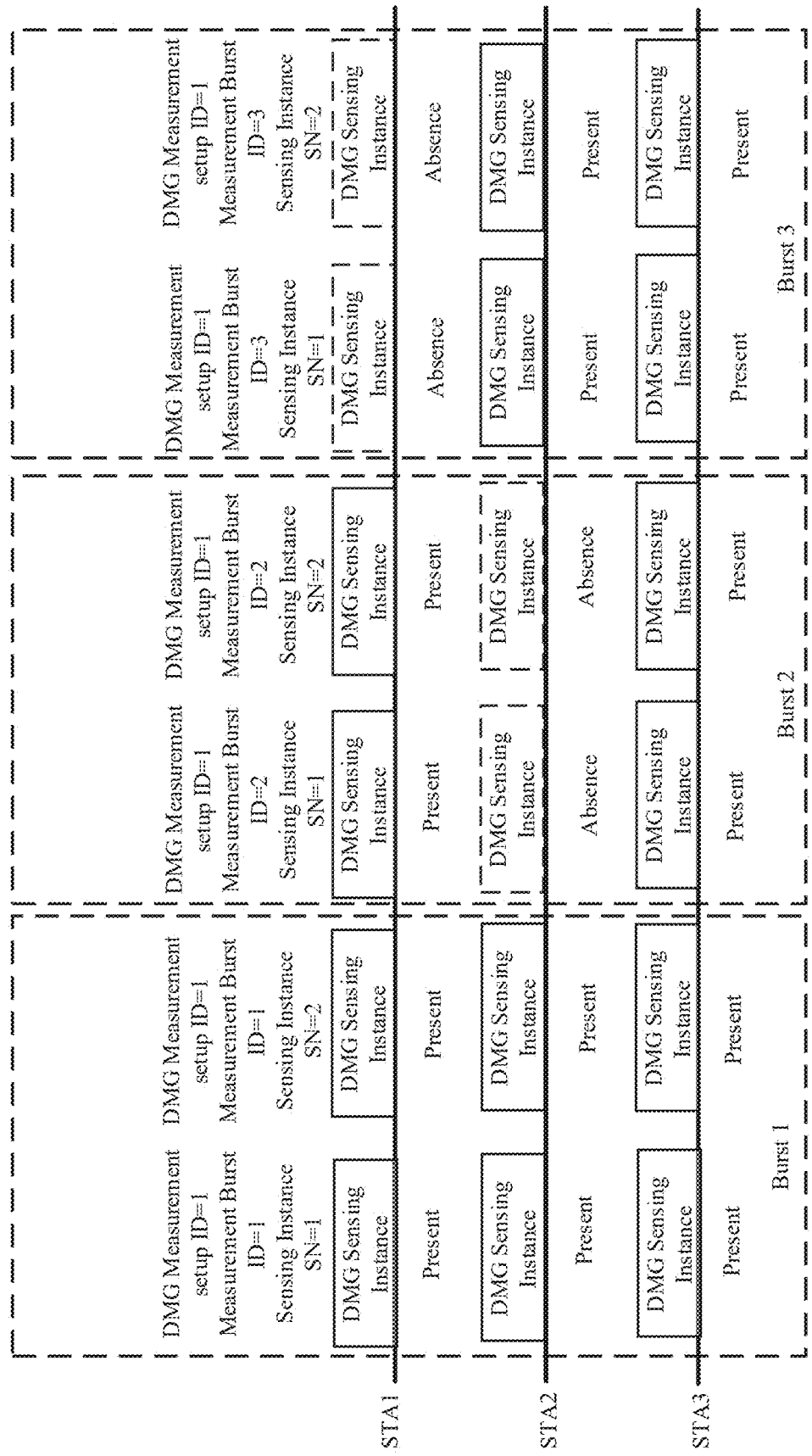
FIG. 14 is another schematic diagram of performing the DMG sensing measurement based on periodic scheduling information according to an embodiment of the present disclosure.

In the example of FIG. 14, the sensing response devices include STA1, STA2, and STA3.

The periodic scheduling information of the STA1 may be as follows.

The DMG sensing unit is a DMG sensing burst, the first number is 2, the second number is 1, and the presence state in the first DMG sensing burst is presence.

Alternatively, the DMG sensing unit is a DMG sensing burst, the scheduling cycle is 3, the third number is 2 (indicating the number of DMG sensing bursts with consecutive presence) or 1 (indicating the number of DMG sensing bursts with consecutive absence), and the presence state in the first DMG sensing burst is presence.

That is, the STA1 presents in two DMG sensing bursts in every three DMG sensing bursts.

The periodic scheduling information of the STA2 may be as follows.

The DMG sensing unit is a DMG sensing burst, the first number is 1, the second number is 1, and the presence state in the first DMG sensing burst is presence.

Alternatively, the DMG sensing unit is a DMG sensing burst, the scheduling cycle is 2, the third number is 1, and the presence state in the first DMG sensing burst is presence.

That is, the STA2 presents in one DMG sensing burst in every two DMG sensing bursts.

The periodic scheduling information of the STA3 may be as follows.

The DMG sensing unit is a DMG sensing burst, the first number is 3, the second number is 0, and the presence state in the first DMG sensing burst is presence.

Alternatively, the DMG sensing unit is a DMG sensing burst, the scheduling cycle is 3, the third number is 3 (indicating the number of DMG sensing bursts with consecutive presence) or 0 (indicating the number of DMG sensing bursts with consecutive absence), and the presence state in the first DMG sensing burst is presence.

That is, the STA3 presents in all DMG sensing bursts.

Embodiment 2: Second Scheduling Information

In some embodiments, the second scheduling information may be used for temporary scheduling in the DMG sensing instance phase. The presence state of the sensing response device in the DMG sensing instance phase is modified by the second scheduling information, which is beneficial to realize flexible presence scheduling.

Embodiment 2-1

The second scheduling information is used for indicating the number (denoted as the fourth number) of DMG sensing units with the consecutive presence or absence of the second device, and the unit of DMG sensing units.

In some embodiments, the fourth number may be calculated starting from the current DMG sensing unit, or may be calculated starting from the next DMG sensing unit.

That is, the second scheduling information is used for indicating the number of DMG sensing units with consecutive presence or absence starting from the current DMG sensing unit.

Exemplarily, the unit of the DMG sensing unit is a DMG sensing instance, and the second scheduling information is used for indicating the number of DMG sensing instances with consecutive presence or absence starting from the current DMG sensing instance.

Exemplarily, the unit of the DMG sensing unit is a DMG sensing instance, and the second scheduling information is used for indicating the number of DMG sensing instances with consecutive presence or absence starting from the next DMG sensing instance. In this case, the presence of the second device in the current DMG sensing instance is default or the absence of the second device in the current DMG sensing instance is default.

Exemplarily, the unit of the DMG sensing unit is a DMG sensing burst, and the second scheduling information is used for indicating the number of DMG sensing bursts with consecutive presence or absence starting from the current DMG sensing burst.

Exemplarily, the unit of the DMG sensing unit is a DMG sensing burst, and the second scheduling information is used for indicating the number of DMG sensing bursts with consecutive presence or absence starting from the next DMG sensing burst. In this case, the presence of the second device in the current DMG sensing burst is default or the absence of the second device in the current DMG sensing burst is default.

In Embodiment 2-2, the second scheduling information is used for indicating the number (denoted as the fifth number) of DMG sensing instances with consecutive presence or absence of the second device.

In this embodiment 2-2, the unit of the scheduling information is a DMG sensing instance by default.

In some embodiments, the second scheduling information is used for indicating the number of DMG sensing instances with consecutive presence or consecutive absence starting from the current DMG sensing instance.

In other embodiments, the second scheduling information is used for indicating the number of DMG sensing instances with consecutive presence or absence starting from the next DMG sensing instance. The presence of the second device in the current DMG sensing instance is default, or the absence of the second device in the current DMG sensing instance is default.

Hereinafter, a specific implementation in which the sensing response device performs DMG sensing measurement based on aperiodic scheduling information will be described with reference to FIG. 15.

Figure 15:
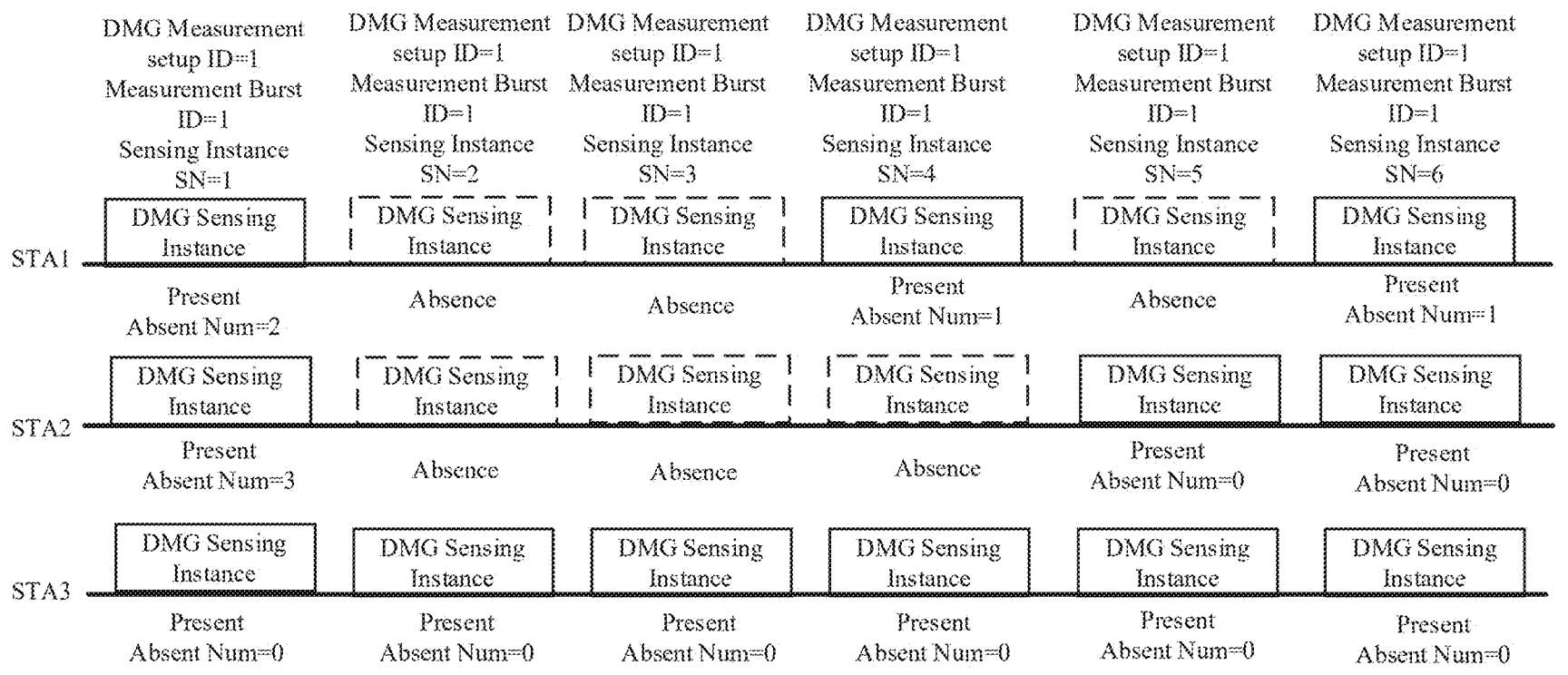

In the example of FIG. 15, the sensing response device includes STA1, STA2, and STA3.

The aperiodic scheduling information of the STA1 may be as follows.

The DMG sensing unit is a DMG sensing instance, the fourth number is 2 (indicating the absence in the next two DMG sensing instances), and the presence in the current DMG sensing instance is default.

Alternatively, the fifth number is 2 (indicating the absence in the next two DMG sensing instances), and the presence in the current DMG sensing instance is default.

The aperiodic scheduling information of the STA2 may be as follows.

The DMG sensing unit is a DMG sensing instance, the fourth number is 3 (indicating that the absence in the next three DMG sensing instances), and the presence in the current DMG sensing instance is default.

Alternatively, the fifth number is 3 (indicating that the absence in the next three DMG sensing instances), and the presence in the current DMG sensing instance is default.

The aperiodic scheduling information of the STA3 may be as follows.

The DMG sensing unit is a DMG sensing instance, the fourth number is 0 (indicating that the number of DMG sensing instances with the absence of STA3 is 0), and the presence in the current DMG sensing instance is default.

Alternatively, the fifth number is 0 (indicating that the number of DMG sensing instances with the absence of STA3 is 0), and the presence in the current DMG sensing instance is default.

Example 3

In some embodiments, the third scheduling information is used for implicitly determining scheduling information of the second device. The manner that the second device determines the presence state in the DMG sensing measurement based on the third scheduling information may be considered as a passive presence scheduling manner or an implicit presence scheduling manner.

For example, the third scheduling information is used for indicating the maximum number (which is denoted as the sixth number N6) of STA devices presenting in a DMG sensing instance, or the third scheduling information is used for indicating the maximum initialization time of the DMG sensing instance.

In some embodiments, the maximum number of STA devices presenting in the DMG sensing instance may be used for determining the maximum initialization time of the DMG sensing instance.

For example, the maximum initialization time may be determined according to the maximum number of STA devices presenting in the DMG sensing instance, the time required for transmitting the DMG sensing request frame and the DMG sensing response frame, and the interframe space.

Exemplarily, the initialization maximum time=$N6*(T_{DMG\ Sensing\ Request}+T_{DMG\ Sensing\ Response})+(N6-1)*SIFS$.

Herein, $T_{DMG\ Sensing\ Request}$ is the time required for transmitting the DMG sensing request frame, and $T_{DMG\ Sensing\ Response}$ is the time required for transmitting the DMG sensing response frame.

In some embodiments, when the DMG sensing request frame from the AP device is not received within the maximum initialization time, it may be considered that the presence in the current DMG sensing instance is not needed. Further, the second device may be in an absence state from the current DMG sensing instance to the start of the next DMG sensing instance.

In some embodiments, when the DMG sensing request frame from the AP device is received within the maximum initialization time, it may be considered that the presence in the current DMG sensing instance is needed.

Hereinafter, a specific implementation that the sensing response device performs the DMG sensing measurement based on the third scheduling information will be described with reference to FIG. 16.

Figure 16:
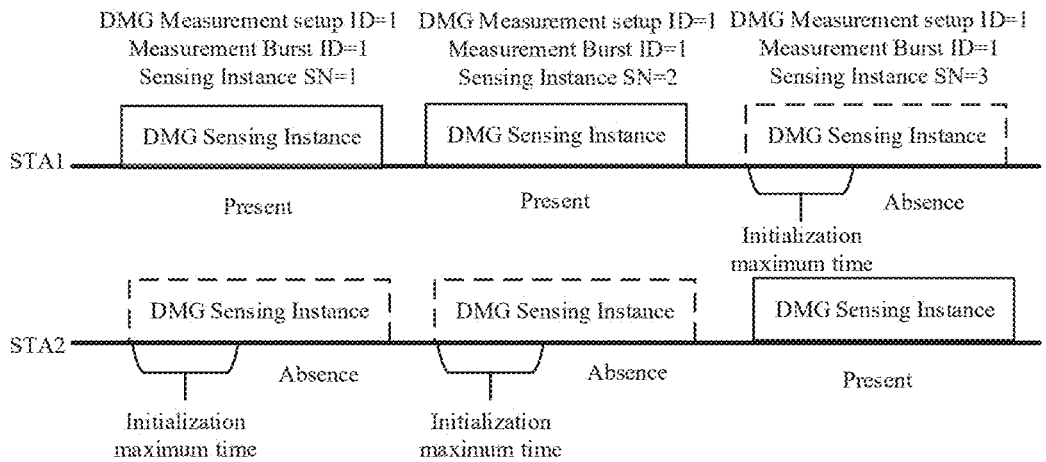
FIG. 16 is a schematic diagram of performing the DMG sensing measurement based on the third scheduling information according to an embodiment of the present disclosure.

In the example of FIG. 16, the sensing response devices include STA1 and STA2.

The STA 1 receives the DMG Sensing Request frame within the "initialization maximum time" in the DMG sensing instance 1 and DMG sensing instance 2, so it normally presents in the DMG sensing instance 1 and DMG sensing instance 2, but it does not receive the DMG Sensing Request frame within the "initialization maximum time" in the DMG sensing instance 3, so it does not present in the DMG sensing instance 3.

The STA 2 does not receive the DMG Sensing Request frame within the "initialization maximum time" in the DMG sensing instance 1 and DMG sensing instance 2, so it does not present in the DMG sensing instance 1 and DMG sensing instance 2, but it receives the DMG Sensing Request frame within the "initialization maximum time" in the DMG sensing instance 3, so it normally presents in DMG sensing instance 3.

Hereinafter, a frame format design that carries the first scheduling information, the second scheduling information, and the third scheduling information will be described, respectively.

Embodiment 4: Design of Frame Format Carrying the First Scheduling Information

In some embodiments, the first scheduling information is transmitted during a DMG Sensing Measurement Setup phase. For example, the first scheduling information may be transmitted through a frame in the DMG Sensing Measurement Setup phase.

In some embodiments, the first scheduling information may be carried through an existing frame, or a newly defined frame may be used to carry the first scheduling information, which is not limited in the present disclosure.

In some embodiments, the first scheduling information is carried in the first frame. The first frame includes at least one of: a DMG Sensing Measurement Setup Request frame, a DMG Sensing Measurement Setup Response frame, a DMG Sensing SBP Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

For example, when the first device is a sensing initiating device, the first frame may include at least one of: a DMG Sensing Measurement Setup Request frame, a DMG Sensing Measurement Setup Response Frame, a Protected DMG Sensing Measurement Setup Request frame, or a Protected DMG Sensing Measurement Setup Response frame.

For another example, when the first device is a SBP device, the first frame may include at least one of: a DMG Sensing SBP Request frame, a DMG Sensing SBP Response frame, a Protected DMG Sensing SBP Request frame, or a Protected DMG Sensing SBP Response frame.

It should be understood that, in the embodiments of the present disclosure, the first scheduling information may be carried in an existing field, an existing element, or an existing subelement in the first frame, or a newly defined field, element, or subelement may be used for carrying the first scheduling information, and the specific manner for carrying the first scheduling information is not limited in the present disclosure.

In some embodiment of the present disclosure, the first frame includes a DMG Sensing Measurement Setup element, and the DMG Sensing Measurement Setup element carries the first scheduling information.

Figure 17:
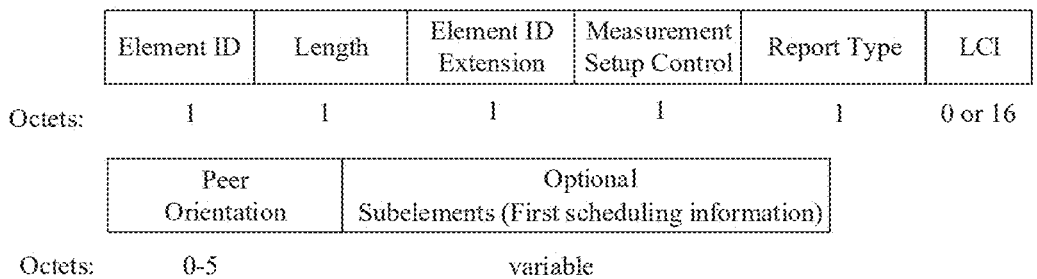
FIG. 17 is a schematic format diagram of carrying the first scheduling information through Optional Subelements in a DMG Sensing Measurement Setup element according to an embodiment of the present disclosure.

In some embodiments, the first scheduling information is carried in Optional Subelements of the DMG Sensing Measurement Setup element. FIG. 17 illustrates a schematic format diagram of carrying the first scheduling information through Optional Subelements in the DMG Sensing Measurement Setup element.

Embodiment 4-1: A Subelement is Newly Defined in the DMG Sensing Measurement Setup Element to Carry the First Scheduling Information For example, a DMG Sensing Presence Schedule subelement, or may called a DMG Sensing Absence Schedule subelement, is newly defined. The first scheduling information is carried through DMG Sensing Absence Schedule subelement.

Alternatively, the subelement ID of the DMG Sensing Absence Schedule suelement may be a reserved value, for example, 5.

When the first scheduling information is carried through the DMG Sensing Absence Schedule subelement, the definition of Optional Suelements may be shown in Table 13.

TABLE 13

| Subelement ID | Subelement Name | Extensible |
|---|---|---|
| 1 | TX Beam List | Yes |
| 2 | RX Beam List | Yes |
| 3 | DMG Sensing Scheduling | Yes |
| 4 | Burst Response Delay | Yes |
| 5 | DMG Sensing Absence Schedule | Yes |
| 6-255 | Reserved | No |

In some embodiments, the DMG Sensing Absence Schedule subelement may be used for negotiating the periodic presence schedule information of the device.

In some embodiments, the DMG Sensing Presence Schedule subelement includes at least one of: the first number field for indicating the number of DMG sensing units with consecutive presence of the second device; the second number field for indicating the number of DMG sensing units with consecutive absence of the second device; an Instance or Burst field for indicating that a unit of the DMG sensing units is a DMG sensing instance or a DMG sensing burst; or a state field for indicating a presence state of the second device in the first DMG sensing unit.

Figure 18:
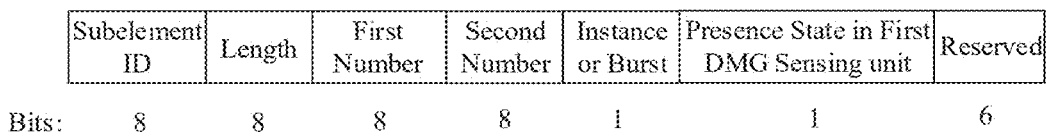
FIG. 18 is a schematic format diagram of carrying the first scheduling information through a DMG Sensing Presence Schedule subelement according to an embodiment of the present disclosure.

FIG. 18 illustrates a DMG Sensing Presence Schedule subelement format. It should be understood that the fields included in the DMG Sensing Presence schedule subelement, and the positions and lengths of various fields illustrated in FIG. 18 are merely examples, but the present disclosure is not limited thereto, and the fields included in the DMG Sensing Presence schedule subelement, and the positions and lengths of various fields may be flexibly adjusted according to the actual situation.

As illustrated in FIG. 18, the first number field indicates the number of DMG sensing units with consecutive presence of the second device. The second number field indicates the number of DMG sensing units with consecutive absence of the second device, and the value of the field being 0 indicates that the second device presents in each DMG sensing unit.

The Instance or Burst field indicates whether the presence schedule information is in a unit of a DMG sensing instance or in a unit of a DMG sensing burst. For example, the field being set to 0 indicates that the unit is DMG sensing instance, and the field being set to 1 indicates that the unit is DMG sensing burst. Alternatively, the field being set to 1 indicates that the unit is DMG sensing instance, and the field being set to 0 indicates that the unit is DMG sensing burst.

The presence state field in the first DMG sensing unit (State in First Instance/Burst field) indicates the presence state of the second device in the first DMG sensing instance or DMG sensing burst in a scheduling cycle. For example, the value being set to 0 indicates absence, and the value being set to 1 indicates presence. Alternatively, the value being set to 1 indicates absence, and the value being set to 0 indicates presence.

In other embodiments, the DMG Sensing Presence Schedule subelement includes at least one of: a cycle field for indicating scheduling cycle information of the presence state; the third number field for indicating the number of DMG sensing units with consecutive presence or absence of the second device in a cycle; an Instance or Burst field for indicating that a unit of the DMG sensing units is a DMG sensing instance or a DMG sensing burst; or a state field for indicating a presence state of the second device in the first DMG sensing unit.

Figure 19:
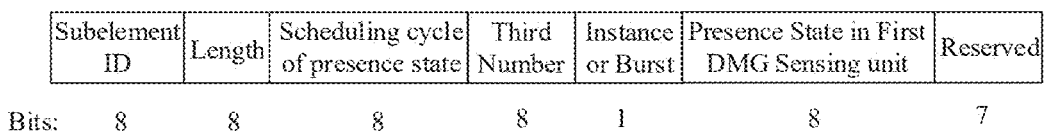
FIG. 19 is another schematic format diagram of carrying the first scheduling information through a DMG Sensing Presence Schedule subelement according to an embodiment of the present disclosure.

FIG. 19 illustrates another DMG Sensing Presence Schedule subelement format. It should be understood that the fields included in the DMG Sensing Presence Schedule subelement, and the positions and lengths of various fields illustrated in FIG. 19 are merely examples, but the present disclosure is not limited thereto, and the fields included in the DMG Sensing Presence Schedule subelement, and the positions and lengths of various fields may be flexibly adjusted according to the actual situation.

As illustrated in FIG. 19, the scheduling cycle field of the presence state indicates a cycle of presence scheduling, or a cycle of absence scheduling.

The third number field indicates the number of DMG sensing units with consecutive presence of the second device or the number of DMG sensing units with consecutive absence of the second device.

The Instance or Burst field is used to indicate whether the presence schedule information is in a unit of a DMG sensing instance or in a unit of a DMG sensing burst. For example, the value being set to 0 indicates that the unit is the DMG sensing instance, and the value being set to 1 indicates that the unit is the DMG sensing burst. Alternatively, the value being set to 1 indicates that the unit is the DMG sensing instance, and the value being set to 0 indicates that the unit is the DMG sensing burst.

The presence state field in the first DMG sensing unit (State in First Instance/Burst field) indicates the presence state of the second device in the first DMG sensing instance or first DMG sensing burst in a scheduling cycle. For example, the value being set to 0 indicates absence, and the value being set to 1 indicates presence. Alternatively, the value being set to 1 indicates absence, and the value being set to 0 indicates presence.

Embodiment 4-2: An Existing Subelement in the DMG Sensing Measurement Setup Element is Used for Carrying the First Scheduling Information In some embodiment, the first scheduling information is carried through a DMG Sensing Scheduling suelement in a DMG Sensing Measurement Setup element. For example, a field is newly added to the DMG Sensing Scheduling suelement to carry the first scheduling information.

In some embodiments, the DMG Sensing Scheduling subelement includes at least one of: the first number field for indicating the number of DMG sensing units with consecutive presence of the second device; the second number field for indicating the number of DMG sensing units with consecutive absence of the second device; an Instance or Burst field for indicating that a unit of the DMG sensing units is a DMG sensing instance or a DMG sensing burst; or a state field for indicating a presence state of the second device in the first DMG sensing unit.

FIG. 20 illustrates a format diagram for carrying the first scheduling information through the DMG Sensing Scheduling subelement. It should be understood that the fields included in the DMG Sensing Scheduling subelement, and the positions and lengths of various fields illustrated in FIG. 20 are merely examples, but the present disclosure is not limited thereto, and the fields included in the DMG Sensing Scheduling subelement, and the positions and lengths of various fields may be flexibly adjusted according to the actual situation. Here, for the meanings of various fields in the DMG Sensing Scheduling subelement, the reference is made to the description of the corresponding field in FIG. 18, which is not repeated here for the sake of brevity.

In other embodiments, the DMG Sensing Scheduling subelement includes at least one of: a cycle field for indicating scheduling cycle information of the presence state; the third number field for indicating the number of DMG sensing units with consecutive presence of the second device in a cycle or consecutive absence of the second device in a cycle; an Instance or Burst field for indicating that a unit of the DMG sensing unit is a DMG sensing instance or a DMG sensing burst; or a state field for indicating a presence state of the second device in the first DMG sensing unit.

In other embodiments, the DMG Sensing Scheduling subelement includes at least one of: a cycle field for indicating scheduling cycle information of the presence state; the third number field for indicating a number of DMG sensing units with consecutive presence of the second device in a cycle or consecutive absence of the second device in a cycle; an Instance or Burst field for indicating that a unit of the DMG sensing unit is a DMG sensing instance or a DMG sensing burst; or a state field for indicating a presence state of the second device in the first DMG sensing unit.

FIG. 21 illustrates another format diagram for carrying the first scheduling information through the DMG Sensing Scheduling subelement. It should be understood that the fields included in the DMG Sensing Scheduling subelement, and the positions and lengths of various fields illustrated in FIG. 21 are merely examples, but the present disclosure is not limited thereto, and the fields included in the DMG Sensing Scheduling subelement, and the positions and lengths of various fields may be flexibly adjusted according to the actual situation. Here, for the meanings of various fields in the DMG Sensing Scheduling subelement, the reference is made to the description of the corresponding fields in FIG. 19, which is not repeated here for the sake of brevity.

Embodiment 4-3: An Element is Newly Defined in the First Frame to Carry the First Scheduling Information For example, a DMG Sensing Presence Schedule element, or may be called a DMG Sensing Absence Schedule element, is newly defined. The first scheduling information is carried through the DMG Sensing Absence Schedule element.

In some embodiments, the DMG Sensing Absence Schedule element may be used for negotiating periodic presence schedule information of the device.

In some embodiments, the DMG Sensing Presence Schedule element includes at least one of: the first number field for indicating the number of DMG sensing units with consecutive presence of the second device; the second number field for indicating the number of DMG sensing units with consecutive absence of the second device; an Instance or Burst field for indicating that a unit of the DMG sensing units is a DMG sensing instance or a DMG sensing burst; or a state field for indicating a presence state of the second device in the first DMG sensing unit.

FIG. 22 illustrates a format diagram for carrying the first scheduling information through the DMG Sensing Presence Schedule element. It should be understood that the fields included in the DMG Sensing Presence Schedule element, and the positions and lengths of various fields illustrated in FIG. 22 are merely examples, but the present disclosure is not limited thereto, and the fields included in the DMG Sensing Presence Schedule element, and the positions and lengths of various fields may be flexibly adjusted according to the actual situation. Here, for the meanings of various fields in the DMG Sensing Presence Schedule element, the reference is made to the description of the corresponding fields in FIG. 18, which is not repeated here for the sake of brevity.

In other embodiments, the DMG Sensing Presence Schedule element includes at least one of: a cycle field for indicating scheduling cycle information of the presence state; the third number field for indicating the number of DMG sensing units with consecutive presence of the second device in a cycle or the number of DMG sensing units with consecutive absence of the second device in the cycle; an Instance or Burst field for indicating that a unit of the DMG sensing units is a DMG sensing instance or a DMG sensing burst; or a state field for indicating a presence state of the second device in the first DMG sensing unit.

FIG. 23 illustrates another format diagram for carrying the first scheduling information through the DMG Sensing Presence Schedule element. It should be understood that the fields included in the DMG Sensing Presence Schedule element, and the positions and lengths of various fields illustrated in FIG. 23 are merely examples, but the present disclosure is not limited thereto, and the fields included in the DMG Sensing Presence Schedule element, and the positions and lengths of various fields may be flexibly adjusted according to the actual situation. Here, for the meanings of various fields in the DMG Sensing Presence Schedule element, the reference is made to the description of the corresponding fields in FIG. 19, which will not be repeated here for the sake of brevity.

Embodiment 5: Design of a Frame Format Carrying the Second Scheduling Information In some embodiments, the second scheduling information is transmitted during a DMG sensing measurement phase or a DMG sensing instance phase. For example, the second scheduling information may be transmitted through a frame of a DMG sensing measurement phase or a DMG sensing instance phase.

In some embodiments, the second scheduling information may be carried through an existing frame, or a newly defined frame may be used to carry the second scheduling information, which is not limited in the present disclosure.

In some embodiments, the second scheduling information is carried in the second frame. The second frame includes a DMG Sensing Request frame and/or a BRP frame.

It should be understood that, in the embodiments of the present disclosure, the second scheduling information may be carried in an existing field, an existing element, or an existing subelement in the second frame, or a newly defined field, element, or sub-element may be used for carrying the second scheduling information, and the specific manner for carrying the second scheduling information is not limited in the present disclosure.

Embodiment 5-1: The Second Frame is a DMG Sensing Request Frame

The DMG Sensing Request frame includes a TDD Beamforming Information field, and the second scheduling information is carried in the TDD Beamforming Information field. For example, a new field is added to the TDD Beamforming Information field for operating the second scheduling information.

In some embodiments, the second frame includes the following fields: the fourth number field for indicating the number of DMG sensing units with consecutive presence or consecutive absence of the second device; and an Instance or Burst field for indicating that a unit of the DMG sensing units is a DMG sensing instance or a DMG sensing burst.

FIG. 24 illustrates a format of a TDD Beamforming Information field. It should be understood that the fields included in the TDD Beamforming Information field, and the positions and lengths of various fields illustrated in FIG. 24 are merely examples, but the present disclosure is not limited thereto, and the fields included in the TDD Beamforming Information field, and the positions and lengths of various fields may be flexibly adjusted according to the actual situation.

The fourth number field indicates the number of DMG sensing units with consecutive presence or consecutive absence of the second device. The number may include the current DMG sensing unit or may not include the current DMG sensing unit.

The Instance or Burst field indicates whether the presence schedule information is in a unit of DMG sensing instances or a DMG sensing burst. For example, the value being set to 0 indicates that the unit is the DMG sensing instance, and the value being set to 1 indicates that the unit is the DMG sensing burst. Alternatively, the value being set to 1 indicates that the unit is the DMG sensing instance, and the value being set to 0 indicates that the unit is the DMG sensing burst.

In other embodiments, the second frame includes the following fields: the fifth number field for indicating the number of DMG sensing instances with consecutive presence or consecutive absence of the second device. The number may include the current DMG sensing unit or may not include the current DMG sensing unit.

FIG. 25 illustrates a TDD Beamforming Information field format. It should be understood that the fields included in the TDD Beamforming Information field, and the positions and lengths of various fields illustrated in FIG. 25 are merely examples, but the present disclosure is not limited thereto, and the fields included in the TDD Beamforming Information field, and the positions and lengths of various fields may be flexibly adjusted according to the actual situation. Here, the fifth number field indicates the number of DMG sensing instances with consecutive presence or consecutive absence of the second device.

Embodiment 5-2: The Second Frame is a BRP Frame

The BRP frame includes a BRP Sensing element, and the second scheduling information is carried in the BRP Sensing element. For example, a new field is added to the BRP Sensing element for operating the second scheduling information.

In some embodiments, the second frame includes the following fields: the fourth number field for indicating the number of DMG sensing units with consecutive presence or consecutive absence of the second device; and an Instance or Burst field for indicating that a unit of the DMG sensing units is a DMG sensing instance or a DMG sensing burst.

FIG. 26 illustrates a format of BRP Sensing element. It should be understood that the fields included in the BRP Sensing element, and the positions and lengths of various fields illustrated in FIG. 24 are merely examples, but the present disclosure is not limited thereto, and the fields included in the BRP Sensing element, and the positions and lengths of various fields may be flexibly adjusted according to the actual situation. Here, for the meanings of various fields in the BRP Sensing element, the reference is made to the description of the corresponding fields in FIG. 24, which will not be repeatedly described here for the sake of brevity.

In other embodiments, the second frame includes the fifth number field.

The fifth number field is used to indicate the number of DMG sensing instances with consecutive presence or consecutive absence of the second device.

FIG. 27 illustrates a BRP Sensing element format. It should be understood that the fields included in the BRP Sensing element, and the positions and lengths of various fields illustrated in FIG. 27 are merely examples, but the present disclosure is not limited thereto, and the fields included in the BRP Sensing element, and the positions and lengths of various fields may be flexibly adjusted according to the actual situation. Here, for the meanings of various fields in the BRP Sensing element, the reference is made to the description of the corresponding fields in FIG. 25, which will not be repeatedly described here for the sake of brevity.

Embodiment 6: Design of a Frame Format Carrying the Third Scheduling Information In some embodiments, the third scheduling information is transmitted during a DMG Sensing Measurement Setup phase. For example, the third scheduling information may be transmitted through a frame in the DMG Sensing Measurement Setup phase.

In some embodiments, the third scheduling information may be carried through an existing frame, or a newly defined frame may be used to carry the third scheduling information, which is not limited in the present disclosure.

In some embodiments, the third scheduling information is carried in the third frame. The third frame includes at least one of: a DMG Sensing Measurement Setup Request frame, a DMG Sensing Measurement Setup Response frame, a DMG Sensing SBP Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

For example, when the first device is a sensing initiating device, the third frame may include at least one of: a DMG Sensing Measurement Setup Request frame, a DMG Sensing Measurement Setup Response frame, a Protected DMG Sensing Measurement Setup Request frame, or a Protected DMG Sensing Measurement Setup Response frame.

For another example, when the first device is a SBP device, the third frame may include at least one of: a DMG Sensing SBP Request frame, a DMG Sensing SBP Response frame, a Protected DMG Sensing SBP Request frame, or a Protected DMG Sensing SBP Response frame.

In some embodiments, the third frame includes the first indication field. The first indication field indicates the maximum number of STA devices presenting in the DMG sensing instance, or indicates the maximum initialization time.

It should be understood that in the embodiments of the present disclosure, the third scheduling information may be carried in an existing field, an existing element, or an existing subelement in the third frame, or a newly defined field, element, or subelement may be used for carrying the third scheduling information, and the specific manner for carrying the third scheduling information is not limited in the present disclosure.

In some embodiments, the third frame includes a DMG Sensing Measurement Setup element. The third scheduling information is carried in the DMG Sensing Measurement Setup element.

In some implementations, a subelement is newly defined in the DMG Sensing Measurement Setup element to carry the third scheduling information.

For example, a DMG Sensing Presence Schedule subelement, or may be called a DMG Sensing Absence Schedule suelement, is newly defined, and the third scheduling information is carried through the DMG Sensing Absence Schedule suelement.

In other implementations, the third scheduling information is carried by using an existing subelement in the DMG Sensing Measurement Setup element. For example, the DMG Sensing Measurement Setup element includes the DMG Sensing Scheduling suelement. The third scheduling information is carried through the DMG Sensing Scheduling suelement. For example, a field is newly added in the DMG Sensing Scheduling suelement to carry the third scheduling information.

FIG. 28 illustrates a format diagram for carrying the third scheduling information through the DMG Sensing Scheduling subelement. It should be understood that the fields included in the DMG Sensing Scheduling subelement, and the positions and lengths of various fields illustrated in FIG. 28 are merely examples, but the present disclosure is not limited thereto, and the fields included in the DMG Sensing Scheduling subelement, and the positions and lengths of various fields may be flexibly adjusted according to the actual situation. Here, the maximum number field of STAs in each instance indicates a maximum number of STA devices presenting in the DMG sensing instance, and the maximum number may be used to determine a maximum initialization time of the DMG sensing instance.

FIG. 29 illustrates another format diagram for carrying the third scheduling information through the DMG Sensing Scheduling subelement. It should be understood that the fields included in the DMG Sensing Scheduling subelement, and the positions and lengths of various fields illustrated in FIG. 29 are merely examples, but the present disclosure is not limited thereto, and the fields included in the DMG Sensing Scheduling subelement, and the positions and lengths of various fields may be flexibly adjusted according to the actual situation. The maximum initialization time field indicates the maximum initialization time of the DMG sensing instance. Alternatively, the unit of the maximum initialization time may be microsecond.

In some embodiments of the present disclosure, the target scheduling information is transmitted by the first device based on the first primitive and the second primitive. The first primitive is used for requesting a modification for a sensing parameter of the sensing response device, and the second primitive is used for reporting a result of modifying the sensing parameter of the sensing response device. The sensing parameter includes the presence state of the sensing response device.

In some embodiments, the first primitive and the second primitive are used for the transmission of the parameter(s) related to presence scheduling between a station management entity (SME) of the first device and a MAC sublayer management entity (MLME) of the first device.

In some embodiments, the first primitive may be referred to as an MLME-DMG-SENSMSMTUPDATE.request primitive, and the second primitive may be referred to as an MLME-DMG-SENSMSMTUPDATE.confirm primitive.

In some embodiments, the primitive parameter of the first primitive is as follows:

MLME-DMG-SENSMSMTUPDATE.request (
DMG Measuring Setup ID,
DMG Sensing Measurement Setup element with the subelements,
PeerSTAAddress List
)

The DMG Measurement Setup ID indicates the DMG sensing measurement setup ID of the to-be-modified measurement setup.

Herein, DMG Sensing Measurement Setup ID indicates the DMG Sensing Measurement Setup ID of a to be modified measurement setup.

DMG Sensing Measurement Setup element with the subelements is defined in the DMG Sensing Measurement Setup frame. The LCI and Peer Orientation fields are retained.

PeerSTAAddress List represents the address list of the updated sensing responder.

In some embodiments, the first primitive is generated in a case that the modification for the sensing parameter of a particular sensing response device in the current DMG sensing measurement setup is needed. Specifically, the first primitive may be generated by an SME of the first device.

In some embodiments, the reception effect of the first primitive is as follows. After receiving the first primitive, the MLME of the first device updates the sensing parameter for the particular sensing responder, and performs a subsequent sensing process according to the updated sensing parameter.

In some embodiments, the second primitive is used to report the result of MLME-DMG-SENSMSMTUPDATE.request.

In some embodiments, the primitive parameter of the second primitive is as follows:

MLME-DMG-SENSMSMTUPDATE.confirm (
ResultCode
)

Here, the state code indicates that the MLME-DMG-SENSMSMTUPDATE is successful or the MLME-DMG-SENSMSMTUPDATE is refused.

In some embodiments, the second primitive is generated by the MLME of the first device, and serves as a result of the MLME-DMG-SENSMSMTUPDATE.request.

In some embodiments, the reception effect of the second primitive is as follows. The SME of the first device is notified of the result of updating the modification of the sensing parameter of the sensing responder.

In some embodiments, the first scheduling information or the third scheduling information may be transmitted based on the first primitive and the second primitive.

In another embodiment of the present disclosure, the target scheduling information is transmitted by the first device based on the third primitive and the fourth primitive. The third primitive is used for requesting initiation of presence scheduling for a particular sensing responder, for example, requesting the sensing responder in the device list to be presence or absence in one or more DMG sensing units. The fourth primitive is used for reporting a result of requesting the presence scheduling of the particular sensing responder.

In some embodiments, the third primitive may be referred to as the MLME-DMG-SENSMSMTABSENCE.request primitive, and the fourth primitive may be referred to as the MLME-DMG-SENSMSMTABSENCE.confirm primitive.

In some embodiments, the primitive parameter of the third primitive is as follows:

MLME-DMG-SENSMSMTABSENCE.request (
DMG Measuring Setup ID,
Number of PeerSTAAddress,
PeerSTAAddress List
Absence Unit,
Number of Absence Unit List,
)

Here, the DMG Measurement Setup ID indicates a DMG sensing measurement setup ID that needs to perform the presence schedule.

Number of PeerSTAAddress indicates the number of sensing responders that need to perform the presence schedule.

PeerSTAAddress List represents a MAC address list of sensing responders that need to perform the presence schedule.

Absence Unit represents a scheduling unit, such as a DMG sensing instance or a DMG sensing burst.

Number of Absence Unit List represents the number of DMG sensing instances or DMG sensing bursts that each sensing responder needs to be presence or absence.

In some embodiments, the third primitive is generated by the first device SME when the first device needs to perform presence schedule for one or more sensing responders in the current DMG sensing measurement setup.

In some embodiments, the reception effect of the third primitive is as follows. After receiving the third primitive, the MLME of the first device modifies the field related to presence schedule in the DMG Sensing Request frame transmitted to the device included in the PeerSTAAddress List.

In some embodiments, the fourth primitive is used to report the result of MLME-DMG-SENSMSMTABSENCE.request.

In some embodiments, the primitive parameter of the fourth primitive is as follows:

```
MLME-DMG-SENSMSMTABSENCE.confirm (
ResultCode
)
```

Here, the state code indicates that MLME-DMG-SENSMSMTUPDATE is successful or the MLME-DMG-SENSMSMTUPDATE is refused.

In some embodiments, the fourth primitive is generated by the MLME of the first device, and serves as a result of the MLME-DMG-SENSMSMTABSENCE.request.

In some embodiments, the reception effect of the fourth primitive is as follows. The SME of the first device is notified of the result of initiating the presence scheduling.

In some embodiments, the second scheduling information may be transmitted based on the third primitive and the fourth primitive.

Figure 30:
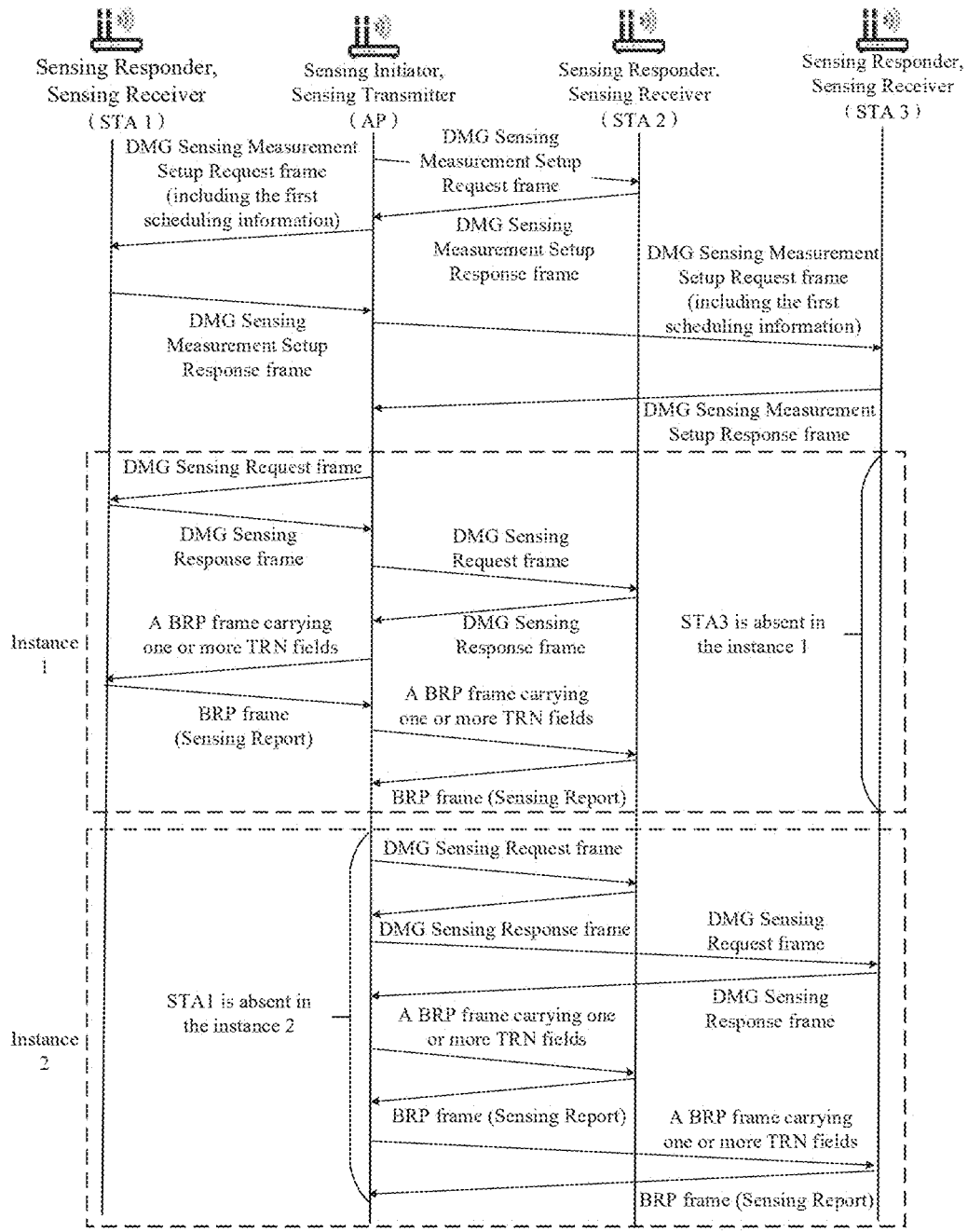
FIG. 30 is a schematic diagram of an interaction for performing the DMG sensing measurement based on periodic scheduling information according to an embodiment of the present disclosure.

In combination with FIG. 30, a schematic diagram of an interaction for performing the DMG sensing measurement based on periodic scheduling information is illustrated by taking Coordinated Bistatic sensing as an example.

In this example, the sensing responders may include STA1, STA2, and STA3.

The STA1 and STA3 negotiate periodic presence schedule information through DMG Sensing Measurement Setup Request frame and DMG Sensing Measurement Setup Response frame. In the DMG sensing instance phase, the STA 1 and the STA 3 do not present in sensing in the DMG sensing instance 2 and the DMG sensing instance 1 respectively according to the negotiated presence schedule information. The STA 2 does not receive the presence schedule information, so the STA 2 remains active state and present in all DMG sensing instances.

Figure 31:
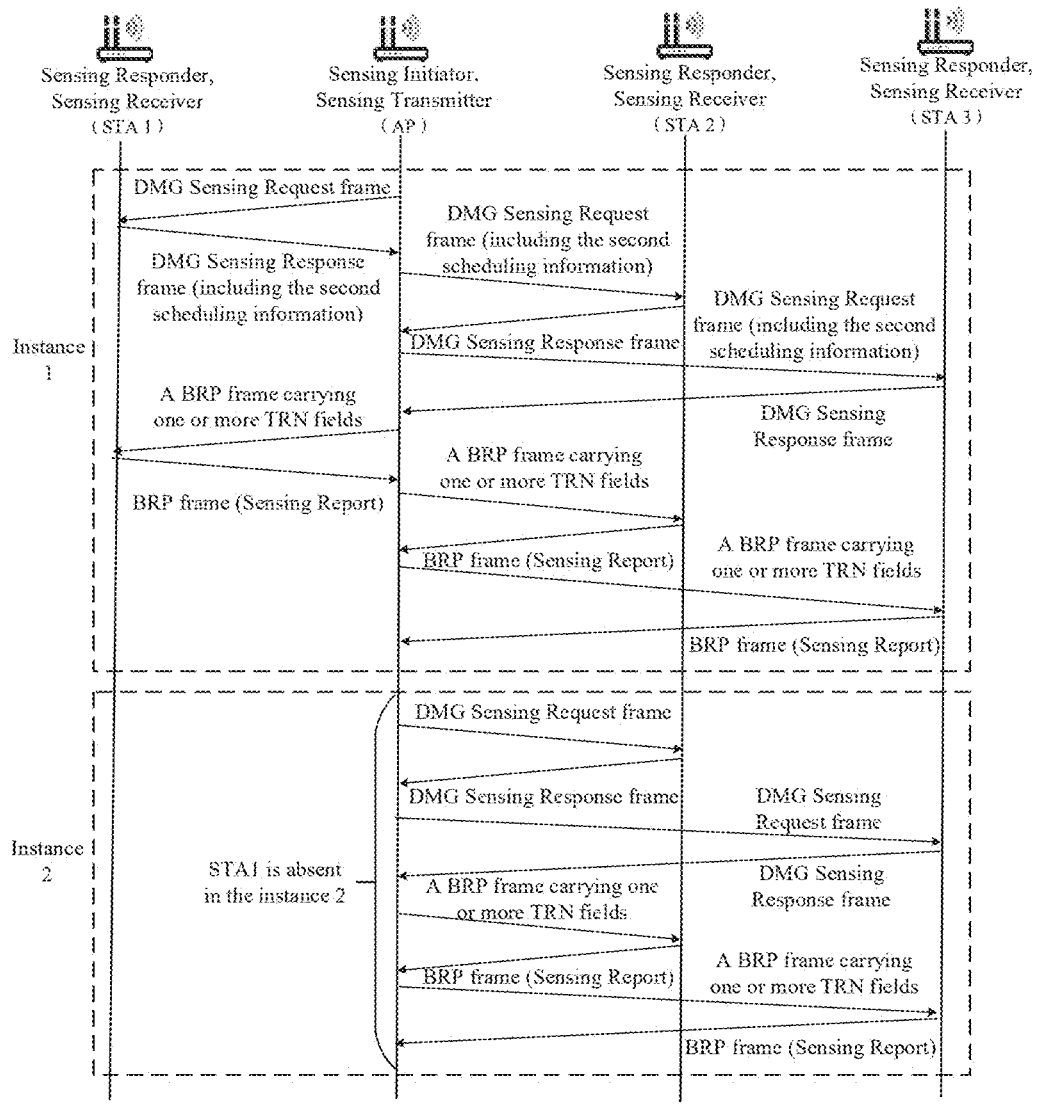
FIG. 31 is a schematic diagram of an interaction for performing the DMG sensing measurement based on aperiodic scheduling information according to an embodiment of the present disclosure.

In combination with FIG. 31, a schematic diagram of an interaction for performing the DMG sensing measurement based on aperiodic scheduling information is illustrated by taking Coordinated Bistatic sensing as an example.

Here, in this example, the sensing responders may include STA1, STA2, and STA3. None of STA1, STA2, and STA3 negotiates presence schedule information in the DMG measurement setup phase. Further, the DMG Sensing request frame is received in the DMG sensing instance phase, so presence of the sensing in the DMG sensing instance 1 is existed. Since the number of DMG sensing instances with absence indicated in the DMG Sensing request frame received the STA 1 is 1, STA 1 does not present in the DMG sensing instance 2. The numbers of DMG sensing instances with absence indicated in the DMG Sensing request frames received the STA 2 and STA3 are 0, so STA 2 and STA 3 present in the DMG sensing instance 2.

Figure 32:
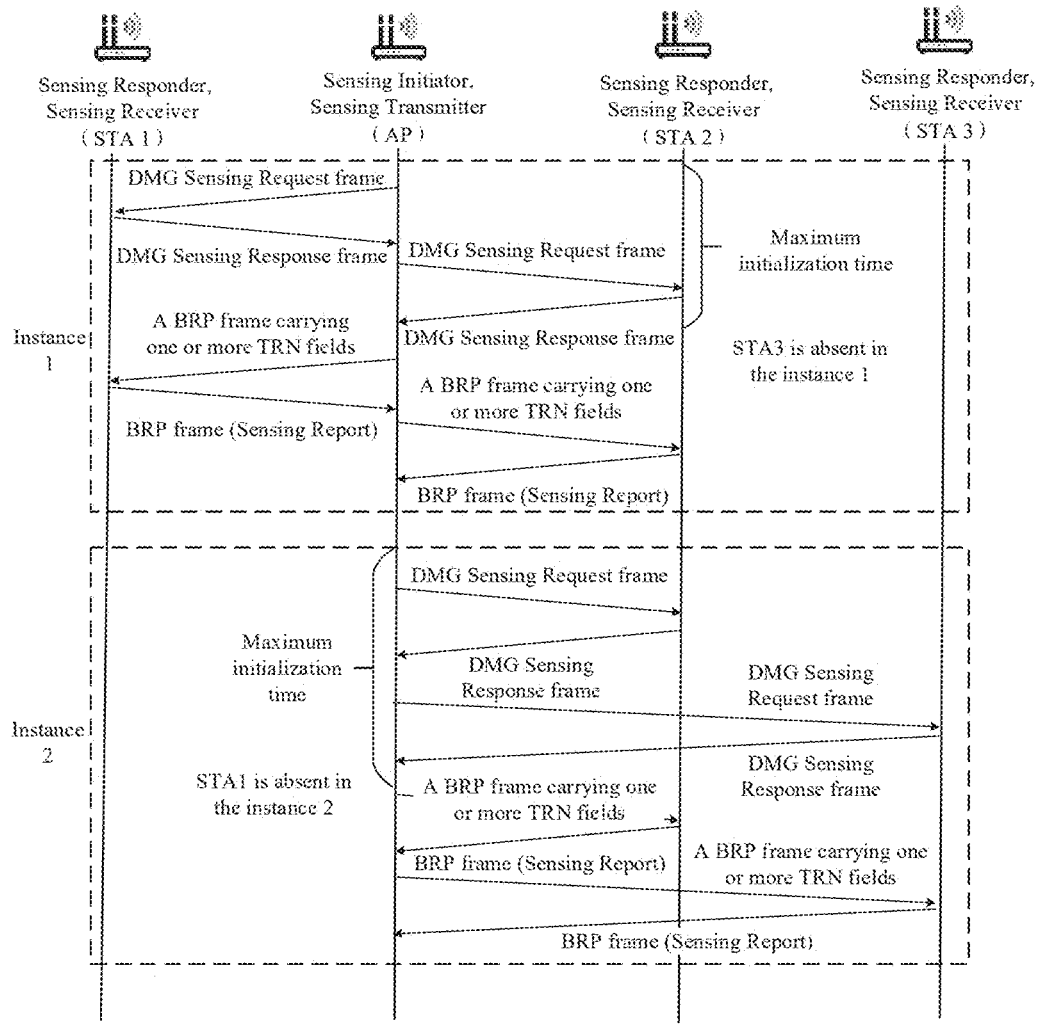
FIG. 32 is a schematic diagram of an interaction for performing the DMG sensing measurement based on the third scheduling information according to an embodiment of the present disclosure.

In combination with FIG. 32, a schematic diagram of an interaction for performing the DMG sensing measurement based on the third scheduling information is illustrated by taking Coordinated Bistatic sensing as an example.

In this example, the sensing responders may include STA1, STA2, and STA3. In the DMG sensing instance 1 phase, the STA3 does not receive the DMG Sensing request frame within the maximum initialization time, so STA3 does not present in sensing in the DMG sensing instance 1. Since STA 1 and STA 2 receive the DMG Sensing request frame within the maximum initialization time, STA 1 and STA 2 present in DMG sensing instance 1. Further, in the DMG sensing instance 2 phase, the STA1 does not receive the DMG Sensing request frame within the maximum initialization time, so the STA1 does not present in sensing in the DMG sensing instance 2. Since STA 2 and STA 3 receive the DMG Sensing request frame within the maximum initialization time, STA 2 and STA 3 present in DMG sensing instance 2.

It should be understood that in the embodiments of the present disclosure, the first scheduling information, the second scheduling information, and the third scheduling information may be used alone or in combination, which is not limited in the embodiments of the present disclosure.

For example, after the first device and the second device have negotiated the periodic presence schedule information in the DMG Sensing Measurement Setup phase, if the second device does not receive the DMG Sensing Request frame in the DMG sensing instance in which the second device is in the presence state, the second device may not present in the DMG sensing instance.

Figure 33:
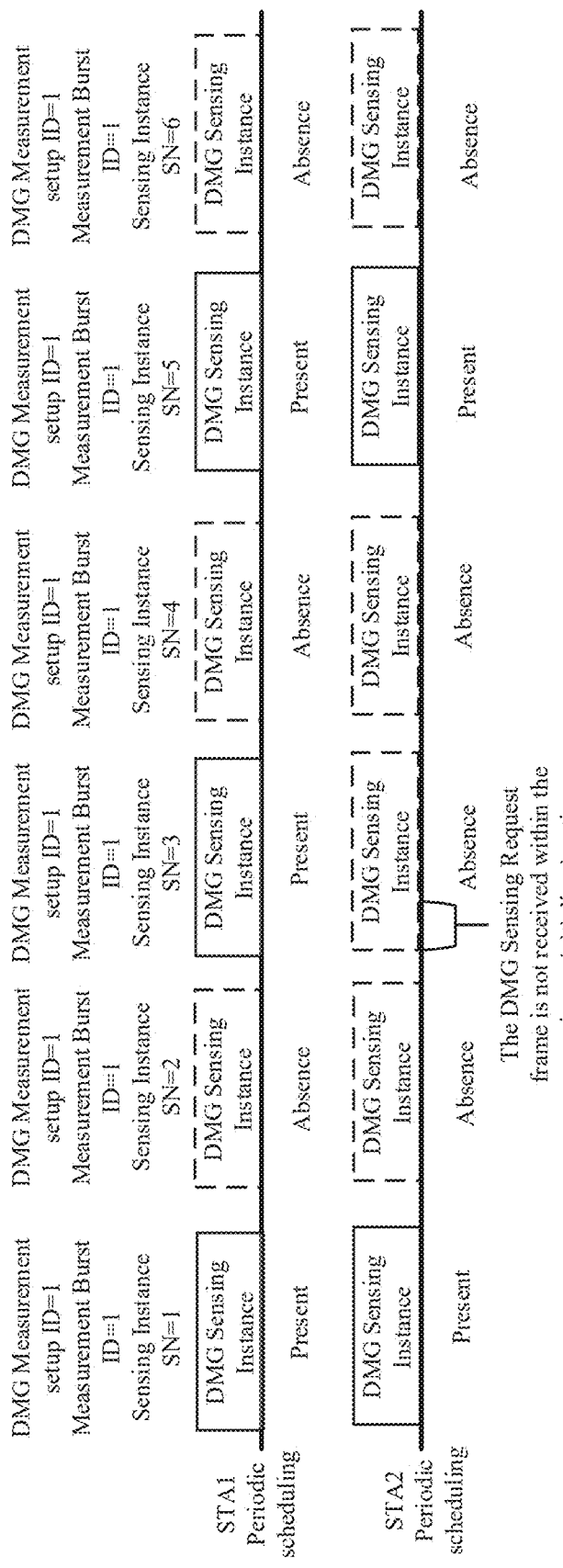
FIG. 33 is a schematic diagram of performing the DMG sensing measurement according to target scheduling information according to an embodiment of the present disclosure.

As an example described with reference to FIG. 33, the periodic scheduling information of STA1 and STA2 may be presenting in one DMG sensing instance in every two DMG sensing instances. According to the periodic scheduling information, the STA2 needs to present in the DMG sensing instance 3, and if the STA2 does not receive the DMG Sensing Request frame within the maximum initialization time of the DMG sensing instance 3, the STA2 may not present in the DMG sensing instance 3.

For another example, after the first device and the second device have negotiated the periodic presence schedule information in the DMG Sensing Measurement Setup phase, if the second device receives a DMG Sensing Request frame in the DMG sensing instance phase, and the DMG Sensing Request frame includes the second scheduling information, then the second device may preferentially perform the DMG sensing measurement according to the second scheduling information, and further perform the DMG sensing measurement according to the periodic scheduling information.

Figure 34:
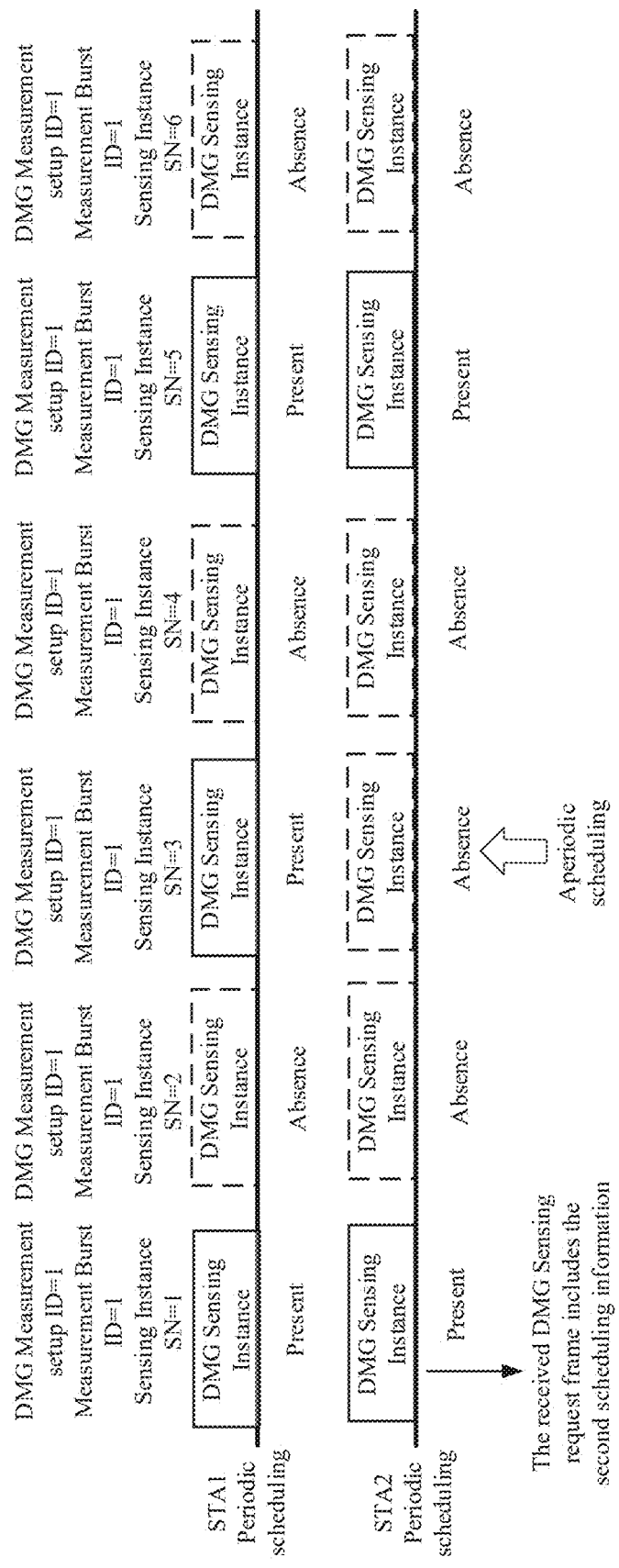
FIG. 34 is another schematic diagram of performing the DMG sensing measurement according to the target scheduling information according to an embodiment of the present disclosure.

As an example described with reference to FIG. 34, the periodic scheduling information of STA1 and STA2 may be presenting in one DMG sensing instance in every two DMG sensing instances. If the STA2 receives a DMG Sensing Request frame in the DMG sensing instance 1, the DMG Sensing Request frame includes the second scheduling information, and the second scheduling information indicates that the number of DMG sensing instances with absence is 3, then the STA2 may not present in the DMG sensing instances 2 to 4, and perform DMG sensing measurement according to the periodic scheduling information in the subsequent DMG sensing instances, for example, the STA2 may present in the DMG sensing instance 5, and be absent in the DMG sensing instance 6.

In summary, the embodiments of the present disclosure provide a presence scheduling mechanism in the DMG sensing measurement, which can realize periodic presence scheduling, aperiodic presence scheduling, or passive presence scheduling of sensing response device(s) in the DMG sensing measurement.

Further, when the sensing response device is absence in scheduling or has completed its own sensing task, the sensing response device enters a power saving mode or a doze state to save power consumption, thereby achieving the purpose of prolonging the use time of the device and improving the use experience of the device.

The embodiments of the method of the present disclosure are described above in detail with reference to FIG. 12 to FIG. 34. The embodiments of the apparatus of the present disclosure are described below in detail with reference to FIG. 35 to FIG. 39. It should be understood that the embodiments of the apparatus and the embodiments of the method correspond to each other, and similar descriptions may be made with reference to the embodiments of the method.

Figure 35:
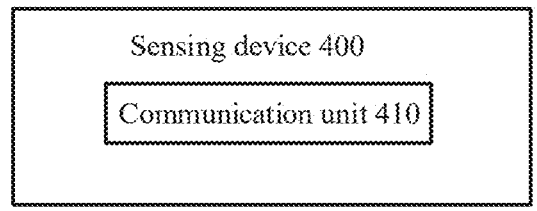
FIG. 35 is a schematic block diagram of a sensing device according to an embodiment of the present disclosure.

FIG. 35 illustrates a schematic block diagram of a sensing device 400 according to an embodiment of the present disclosure. As illustrated in FIG. 35, the sensing device 400 includes a communication unit 410.

The communication unit 410 is configured to transmit target scheduling information to the second device. The target scheduling information is used for determining a presence state of the second device in a DMG sensing measurement. The first device is a sensing initiating device or a SBP device, and the second device is a sensing response device.

In some embodiments, the target scheduling information is used for determining a presence state of the second device in a DMG sensing instance or a presence state of the second device in a DMG sensing burst.

In some embodiments, the target scheduling information includes at least one of: the first scheduling information being periodic scheduling information; the second scheduling information being aperiodic scheduling information; or the third scheduling information for determining a maximum initialization time of a DMG sensing instance.

In some embodiments, the first scheduling information is used for indicating at least one of: a number of DMG sensing units with consecutive presence of the second device, a number of DMG sensing units with consecutive absence of the second device, a unit of the DMG sensing units, or a presence state of the second device in a first DMG sensing unit.

In some embodiments, the first scheduling information is used for indicating at least one of: scheduling cycle information of the presence state, the number of DMG sensing units with consecutive presence or absence of the second device in a cycle, a unit of the DMG sensing units, or a presence state of the second device in a first DMG sensing unit.

In some embodiments, the unit of the DMG sensing units is a DMG sensing instance or a DMG sensing burst.

In some embodiments, the first scheduling information is sent during a DMG sensing measurement setup phase.

In some embodiments, the first scheduling information is carried in the first frame, and the first frame includes at least one of: a DMG Sensing Measurement Setup Request frame, a DMG Sensing Measurement Setup Response frame, a DMG Sensing SBP Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

In some embodiments, the first frame includes a DMG Sensing Measurement Setup element for carrying the first scheduling information, or the first frame includes a DMG Sensing Presence Schedule element dedicated to carrying the first scheduling information.

In some embodiments, the first scheduling information is carried in an optional subelement of the DMG Sensing Measurement Setup element.

In some embodiments, the optional subelement is a DMG Sensing Presence Schedule subelement for carrying the first scheduling information, or the optional subelement is a DMG Sensing Scheduling subelement for carrying the first scheduling information.

In some embodiments, the DMG Sensing Presence Schedule subelement or the DMG Sensing Scheduling subelement includes at least one of: the first number field for indicating the number of DMG sensing units with consecutive presence of the second device; the second number field for indicating the number of DMG sensing units with consecutive absence of the second device; an Instance or Burst field for indicating that a unit of the DMG sensing units is a DMG sensing instance or a DMG sensing burst; or a state field for indicating a presence state of the second device in the first DMG sensing unit.

In some embodiments, the DMG Sensing Presence Schedule subelement or the DMG Sensing Scheduling subelement includes at least one of: a cycle field for indicating scheduling cycle information of the presence state; the third number field for indicating the number of DMG sensing units with consecutive presence of the second device in a cycle or the number of DMG sensing units with consecutive absence of the second device in the cycle; an Instance or Burst field for indicating that a unit of the DMG sensing unit is a DMG sensing instance or a DMG sensing burst; or a state field for indicating a presence state of the second device in a first DMG sensing unit.

In some embodiments, the second scheduling information is used for indicating the number of DMG sensing units with consecutive absence of the second device and a unit of the DMG sensing units.

In some embodiments, the unit of the DMG sensing units is a DMG sensing instance. The second scheduling information is used for indicating the number of DMG sensing instances with consecutive absence starting from a current DMG sensing instance. Alternatively, the second scheduling information is used for indicating the number of DMG sensing instances with consecutive absence starting from a next DMG sensing instance, and the presence of the second device in the current DMG sensing instance is default.

In some embodiments, the unit of the DMG sensing units is a DMG sensing burst. The second scheduling information is used for indicating a number of DMG sensing bursts with consecutive absence starting from a current DMG measurement burst. Alternatively, the second scheduling information is used for indicating a number of DMG sensing bursts with consecutive absence starting from a next DMG sensing burst, and the presence of the second device in the current DMG sensing burst is default.

In some embodiments, the second scheduling information is used for indicating the number of DMG sensing instances with consecutive absence of the second device.

In some embodiments, the second scheduling information is used for indicating the number of DMG sensing instances with consecutive absence starting from a current DMG sensing instance. Alternatively, the second scheduling information is used for indicating the number of DMG sensing instances with consecutive absence starting from a next DMG sensing instance, and the presence of the second device in the current DMG sensing instance is default.

In some embodiments, the second scheduling information is sent during a DMG sensing measurement phase.

In some embodiments, the second scheduling information is carried in the second frame, and the second frame includes a DMG Sensing Request frame and/or a BRP frame.

In some embodiments, the second scheduling information is carried in a TDD Beamforming Information field in the second frame, or in a BRP Sensing element of the BRP frame.

In some embodiments, the second frame includes the following fields: the fourth number field for indicating the number of DMG sensing units with consecutive absence of the second device; and an Instance or Burst field for indicating that a unit of the DMG sensing units is a DMG sensing instance or a DMG sensing burst.

In some embodiments, the second frame includes the following field: the fifth number field for indicating the number of DMG sensing instances with consecutive absence of the second device.

In some embodiments, the third scheduling information is used for indicating the maximum number of STA devices presenting in a DMG sensing instance, or the third scheduling information is used for indicating the maximum initialization time.

In some embodiments, the third scheduling information is sent during a DMG sensing measurement setup phase.

In some embodiments, the third scheduling information is carried in the third frame. The third frame includes at least one of: a DMG Sensing Measurement Setup Request frame, a DMG Sensing Measurement Setup Response frame, a DMG Sensing Sensing by Proxy (SBP) Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

In some embodiments, the third frame includes a DMG Sensing Measurement Setup element. The DMG Sensing Measurement Setup element includes a DMG Sensing Scheduling subelement, and the DMG Sensing Measurement Setup element or the DMG Sensing Scheduling subelement is used for carrying the third scheduling information.

In some embodiments, the DMG Sensing Measurement Setup element or DMG Sensing Scheduling subelement includes: the first indication field for indicating a maximum number of STA devices presenting in a DMG sensing instance, or the maximum initialization time.

In some embodiments, the target scheduling information is sent by the sensing device 400 based on the first primitive and the second primitive. The first primitive is used for requesting a modification for a sensing parameter of the sensing response device, and the second primitive is used for reporting a result of modifying the sensing parameter of the sensing response device. The sensing parameter includes the presence state of the sensing response device in the DMG sensing measurement.

In some embodiments, the first primitive is generated when the modification for the sensing parameter of the sensing response device is required.

In some embodiments, the target scheduling information is transmitted by the sensing device 400 based on the third primitive and the fourth primitive. The third primitive is used for requesting presence or absence of at least one sensing responder in one or more DMG sensing units, and the fourth primitive is used for reporting a result of requesting the presence or absence of at least one sensing responder in the one or more DMG sensing units.

In some embodiments, the third primitive is generated when a modification for the presence state of at least one sensing response device is required.

In some embodiments, parameter(s) of the third primitive include(s) at least one of: identifier(s) (ID) of DMG sensing measurement setup(s) corresponding to one or more DMG sensing units; the number of the at least one sensing responder; Medium Access Control (MAC) address list(s) corresponding to the at least one sensing responder; unit(s) of the DMG sensing unit(s); or the number of DMG sensing units with absence of each of the at least one sensing responder.

Alternatively, in some embodiments, the above communication unit may be a communication interface or a transceiver, or an input/output interface of a communication chip or a system-on-chip. The above processing unit may be one or more processors.

It should be understood that the sensing device 400 according to the embodiments of the present disclosure may correspond to the first device in the embodiments of the methods of the present disclosure, and the above and other operations and/or functions of various units in the sensing device 400 are used to realize the corresponding processes of the first device in the method 200 illustrated in FIG. 12 to FIG. 34, which will not described herein for the sake of brevity in order.

Figure 36:
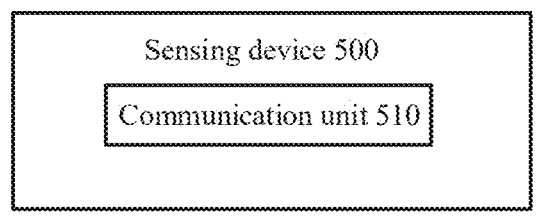
FIG. 36 is another schematic block diagram of the sensing device according to an embodiment of the present disclosure.

FIG. 36 is another schematic block diagram of a sensing device according to an embodiment of the present disclosure. The sensing device 500 of FIG. 36 includes a communication unit 510.

The communication unit 510 is configured to receive target scheduling information transmitted by the first device. The target scheduling information is used for determining a presence state of the second device in a DMG sensing measurement, the first device is a sensing initiating device or a SBP device, and the second device 500 is a sensing response device.

In some embodiments, the target scheduling information is used for determining a presence state of the second device 500 in a DMG sensing instance or a presence state of the second device in a DMG sensing burst.

In some embodiments, the target scheduling information includes at least one of: the first scheduling information being periodic scheduling information; the second scheduling information being aperiodic scheduling information; or the third scheduling information for determining a maximum initialization time of a DMG sensing instance.

In some embodiments, the first scheduling information is used for indicating at least one of: the number of DMG sensing units with consecutive presence of the second device 500, the number of DMG sensing units with consecutive absence of the second device 500, a unit of the DMG sensing units, or a presence state of the second device 500 in a first DMG sensing unit In some embodiments, the first scheduling information is used for indicating at least one of: scheduling cycle information of the presence state, the number of DMG sensing units with consecutive presence or absence of the second device 500 in a cycle, a unit of the DMG sensing units, or a presence state of the second device 500 in the first DMG sensing unit.

In some embodiments, the unit of the DMG sensing units is a DMG sensing instance or a DMG sensing burst.

In some embodiments, the first scheduling information is sent during a DMG measurement setup phase.

In some embodiments, the first scheduling information is carried in the first frame, and the first frame includes at least one of: a DMG Sensing Measurement Setup Request frame, a DMG Sensing Measurement Setup Response frame, a DMG Sensing SBP Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

In some embodiments, the first frame includes a DMG Sensing Measurement Setup element for carrying the first scheduling information, or the first frame includes a DMG Sensing Presence Schedule element dedicated to carrying the first scheduling information.

In some embodiments, the first scheduling information is carried in an optional subelement of the DMG Sensing Measurement Setup element.

In some embodiments, the optional subelement is a DMG Sensing Presence Schedule subelement for carrying the first scheduling information, or the optional subelement is a DMG Sensing Scheduling subelement for carrying the first scheduling information.

In some embodiments, the DMG Sensing Presence Schedule subelement or the DMG Sensing Scheduling subelement includes at least one of: the first number field for indicating the number of DMG sensing units with consecutive presence of the second device 500; the second number field for indicating the number of DMG sensing units with consecutive absence of the second device 500; an Instance or Burst field for indicating that a unit of the DMG sensing units is a DMG sensing instance or a DMG sensing burst; or a state field for indicating a presence state of the second device 500 in the first DMG sensing unit.

In some embodiments, the DMG Sensing Presence Schedule subelement or the DMG Sensing Scheduling subelement includes at least one of: a cycle field for indicating scheduling cycle information of the presence state; the third number field for indicating the number of DMG sensing units with consecutive presence of the second device 500 in a cycle or the number of DMG sensing units with consecutive absence of the second device 500 in the cycle; an Instance or Burst field for indicating that a unit of the DMG sensing unit is a DMG sensing instance or a DMG sensing burst; or a state field for indicating a presence state of the second device 500 in a first DMG sensing unit In some embodiments, the second scheduling information is used for indicating a number of DMG sensing units with consecutive absence of the second device and a unit of the DMG sensing units.

In some embodiments, the unit of the DMG sensing units is a DMG sensing instance. The second scheduling information is used for indicating a number of DMG sensing instances with consecutive absence starting from a current DMG sensing instance. Alternatively, the second scheduling information is used for indicating a number of DMG sensing instances with consecutive absence starting from a next DMG sensing instance, and the presence of the second device 500 in the current DMG sensing instance is default.

In some embodiments, the unit of the DMG sensing units is a DMG sensing burst. The second scheduling information is used for indicating a number of DMG sensing bursts with consecutive absence starting from a current DMG measurement burst. Alternatively, the second scheduling information is used for indicating a number of DMG sensing bursts with consecutive absence starting from a next DMG sensing burst, and the presence of the second device 500 in the current DMG sensing burst is default.

In some embodiments, the second scheduling information is used for indicating a number of DMG sensing instances with consecutive absence of the second device 500.

In some embodiments, the second scheduling information is used for indicating a number of DMG sensing instances with consecutive absence starting from a current DMG sensing instance. Alternatively, the second scheduling information is used for indicating a number of DMG sensing instances with consecutive absence starting from a next DMG sensing instance, and the presence of the second device 500 in the current DMG sensing instance is default.

In some embodiments, the second scheduling information is sent during a DMG sensing measurement phase.

In some embodiments, the second scheduling information is carried in the second frame, and the second frame includes a DMG Sensing Request frame and/or a BRP frame.

In some embodiments, the second scheduling information is carried in a TDD Beamforming Information field in the second frame, or in a BRP Sensing element of the BRP frame.

In some embodiments, the second frame includes the following fields: the fourth number field for indicating the number of DMG sensing units with consecutive absence of the second device 500; and an Instance or Burst field for indicating that a unit of the DMG sensing units is a DMG sensing instance or a DMG sensing burst.

In some embodiments, the second frame includes the following field: the fifth number field for indicating the number of DMG sensing instances with consecutive absence of the second device In some embodiments, the third scheduling information is used for indicating a maximum number of STA devices presenting in a DMG sensing instance, or the third scheduling information is used for indicating the maximum initialization time.

In some embodiments, the third scheduling information is sent during a DMG sensing measurement setup phase.

In some embodiments, the third scheduling information is carried in the third frame. The third frame includes at least one of: a DMG Sensing Measurement Setup Request frame, a DMG Sensing Measurement Setup Response frame, a DMG Sensing Sensing by Proxy (SBP) Request frame, a DMG Sensing SBP Response frame, a Protected DMG Sensing Measurement Setup Request frame, a Protected DMG Sensing Measurement Setup Response frame, a Protected DMG Sensing SBP Request frame, or a Protected DMG Sensing SBP Response frame.

In some embodiments, the third frame includes a DMG Sensing Measurement Setup element. The DMG Sensing Measurement Setup element includes a DMG Sensing Scheduling subelement, and the DMG Sensing Measurement Setup element or the DMG Sensing Scheduling subelement is used for carrying the third scheduling information.

In some embodiments, the DMG Sensing Measurement Setup element or DMG Sensing Scheduling subelement includes: the first indication field for indicating a maximum number of STA devices presenting in a DMG sensing instance, or the maximum initialization time.

In some embodiments, the sensing device 500 further includes a processing unit.

The processing unit is configured to not present in a current measurement instance in a case that a DMG Sensing Request frame is not received within the maximum initialization time; or present in the current measurement instance in a case that the DMG Sensing Request frame is received within the maximum initialization time.

In some embodiments, the sensing device 500 further includes a processing unit.

The processing unit is configured to, in a case that the first scheduling information is received and it is determined according to the first scheduling information that the second device 500 needs to present in a current measurement instance, if the second device 500 does not receive a DMG Sensing Request frame within the maximum initialization time, not present in the current measurement instance.

In some embodiments, the sensing device 500 further includes a processing unit.

The processing unit is configured to perform DMG sensing measurement preferentially according to the second scheduling information when the first scheduling information and the second scheduling information are received.

Alternatively, in some embodiments, the above communication unit may be a communication interface or a transceiver, or an input/output interface of a communication chip or a system-on-chip. The above processing unit may be one or more processors.

It should be understood that the sensing device 500 according to the embodiments of the present disclosure may correspond to the second device in the embodiments of the methods of the present disclosure, and the above and other operations and/or functions of various units in the sensing device 500 are used to realize the corresponding processes of the second device 500 in the method 200 illustrated in FIG. 12 to FIG. 34, which will not described herein for the sake of brevity in order.

Figure 37:
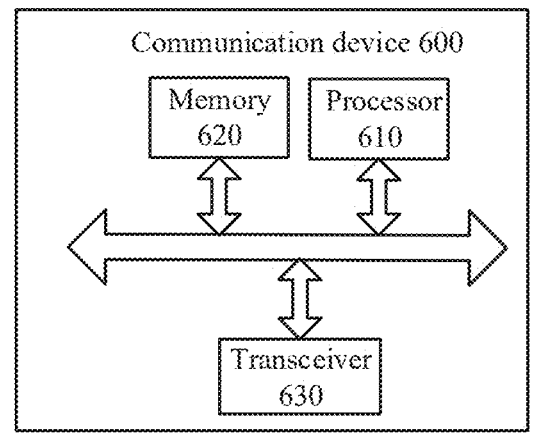
FIG. 37 is a schematic block diagram of a communication device according to an embodiment of the present disclosure.

FIG. 37 is a schematic structural diagram of a communication device 600 according to an embodiment of the present disclosure. The communication device 600 illustrated in FIG. 37 includes a processor 610. The processor may invoke and execute a computer program from a memory to implement the method in the embodiments of the present disclosure.

Alternatively, as illustrated in FIG. 37, the communication device 600 may further include a memory 620. The processor 610 may invoke and execute a computer program from the memory 620 to implement the method in the embodiments of the present disclosure.

The memory 620 may be a separate device independent of the processor 610 or may be integrated in the processor 610.

Alternatively, as illustrated in FIG. 37, the communication device 600 may further include a transceiver 630. The processor 610 may control the transceiver 630 to communicate with other devices, specifically, may transmit information or data to or receive information or data transmitted by other devices.

The transceiver 630 may include a transmitter and a receiver. The transceiver 630 may further include one or more antennas.

Alternatively, the communication device 600 may specifically be the first device according to the embodiments of the present disclosure, and the communication device 600 may implement corresponding processes implemented by the first device in various methods according to the embodiments of the present disclosure, which will not be repeated herein for the sake of brevity.

Alternatively, the communication device 600 may specifically be the second device according to the embodiments of the present disclosure, and the communication device 600 may implement the corresponding processes implemented by the second device in various methods according to the embodiments of the present disclosure, which will not be repeated herein for the sake of brevity.

Figure 38:
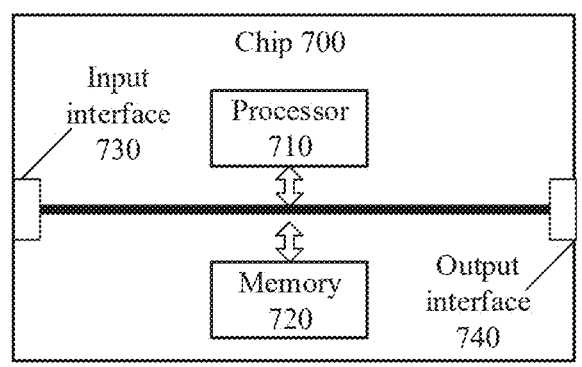
FIG. 38 is a schematic block diagram of a chip according to an embodiment of the present disclosure.

FIG. 38 is a schematic structural diagram of a chip according to an embodiment of the present disclosure. The chip 700 illustrated in FIG. 38 includes a processor 710, and the processor 710 may invoke and execute a computer program from a memory to implement the methods in the embodiments of the present disclosure.

Alternatively, as illustrated in FIG. 38, the chip 700 may further include a memory 720. The processor 710 may invoke and execute a computer program from the memory 720 to implement the methods in the embodiments of the present disclosure.

The memory 720 may be a separate device independent of the processor 710 or may be integrated in the processor 710.

Alternatively, the chip 700 may further include an input interface 730. The processor 710 may control the input interface 730 to communicate with other devices or chips, specifically, may acquire information or data transmitted by other devices or chips.

Alternatively, the chip 700 may further include an output interface 740. The processor 710 may control the output interface 740 to communicate with other devices or chips, specifically, may output information or data to other devices or chips.

Alternatively, the chip may be applied to the first device in the embodiments of the present disclosure, and the chip may implement the corresponding processes implemented by the first device in various methods of the embodiments of the present disclosure, which will not be repeated herein for the sake of brevity.

Alternatively, the chip may be applied to the second device in the embodiments of the present disclosure, and the chip may implement the corresponding processes implemented by the second device in various methods of the embodiments of the present disclosure.

It should be understood that the chip mentioned in the embodiments of the present disclosure may be called a system level chip, a system chip, a chip system or a system-on-chip or the like.

Figure 39:
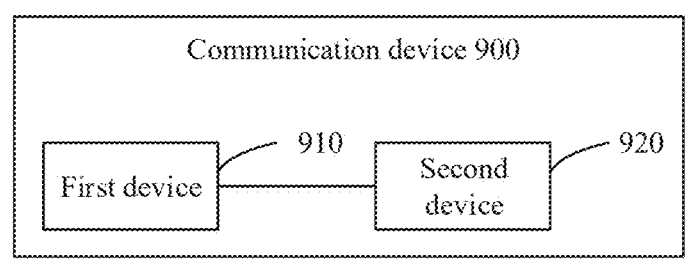
FIG. 39 is a schematic block diagram of a communication system according to an embodiment of the present disclosure.

FIG. 39 is a schematic block diagram of a communication system 900 according to an embodiment of the present disclosure. As illustrated in FIG. 39, the communication system 900 includes the first device 910 and the second device 920.

The first device 910 may be configured to implement the corresponding functions implemented by the first device in the above methods, and the second device 920 may be configured to implement the corresponding functions implemented by the second device in the above methods, which will not be repeated herein for the sake of brevity.

It should be understood that the processor of the embodiments of the present disclosure may be an integrated circuit chip having signal processing capabilities. In the implementation process, the operations of the above method embodiments may be completed by integrated logic circuits of hardware in the processor or instructions in the form of software. The processor described above may be a general-purpose processor, a Digital Signal Processor (DSP), an Application Specific Integrated Circuit (ASIC), a Field Programmable Gate Array (FPGA) or other programmable logic device, a discrete gate or transistor logic device, or a discrete hardware component. The methods, operations, and logical block diagrams disclosed in the embodiments of the present disclosure may be implemented or executed. The general-purpose processor may be a microprocessor or the processor may be any conventional processor or the like.

The operations of the method disclosed in combination with the embodiments of the present disclosure may be directly embodied as execution by the hardware decoding processor, or may be executed by a combination of hardware and software modules in the decoding processor. The software module may be located in a Random Access Memory (RAM), a flash memory, a Read-Only Memory (ROM), a Programmable ROM (PROM), an electrically erasable PROM (EEPROM), a register and other storage medium mature in the art. The storage medium is located in the memory, and the processor reads the information in the memory and completes the operations of the methods in combination with its hardware.

It is understood that the memory in the embodiments of the present disclosure may be a volatile memory or a non-volatile memory, or may include both volatile and non-volatile memory. The non-volatile memory may be a ROM, a PROM, an Erasable PROM (EPROM), an EEPROM, or a flash memory. The volatile memory may be a RAM, which serves as an external cache. By way of illustration, but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ES-DRAM), Synchlink DRAM (SLDRAM) and Direct Rambus RAM (DR RAM). It should be noted that the memory of the systems and methods described herein is intended to include, but is not limited to, these and any other suitable type of memory.

It should be understood that the above memory is exemplary, but not limiting, and, for example, the memory in embodiments of the present disclosure may also be an SRAM, a DRAM, an SDRAM, a DDR SDRAM, an ESDRAM, an SLDRAM, a DR RAM, etc. That is, the memory in embodiments of the present disclosure is intended to include but not limited to these and any other suitable types of memory.

Embodiments of the present disclosure further provide a computer readable storage medium for storing a computer program.

Alternatively, the computer readable storage medium may be applied to the first device in the embodiments of the present disclosure, and the computer program causes the computer to perform the corresponding processes implemented by the first device in various methods of the embodiments of the present disclosure, which will not be repeated herein for the sake of brevity.

Alternatively, the computer readable storage medium may be applied to the second device in the embodiments of the present disclosure, and the computer program causes the computer to perform the corresponding processes implemented by the second device in various methods of the embodiments of the present disclosure, which will not be repeated herein for the sake of brevity.

Embodiments of the present disclosure further provide a computer program product including computer program instructions.

Alternatively, the computer program product may be applied to the first device in the embodiments of the present disclosure, and the computer program instructions cause the computer to execute the corresponding processes implemented by the first device in various methods of the embodiments of the present disclosure, which will not be repeated herein for the sake of brevity.

Alternatively, the computer program product may be applied to the second device in the embodiments of the present disclosure, and the computer program instruction causes the computer to execute the corresponding processes implemented by the second device in various methods of the embodiments of the present disclosure, which will not be repeated herein for the sake of brevity.

Embodiments of the present disclosure further provide a computer program.

Alternatively, the computer program may be applied to the first device in the embodiments of the present disclosure, and when the computer program is executed on the computer, the computer executes the corresponding processes implemented by the first device in various methods of the embodiments of the present disclosure, which will not be repeated herein for the sake of brevity.

Alternatively, the computer program may be applied to the second device in the embodiments of the present disclosure, and when the computer program is executed on the computer, the computer executes the corresponding processes implemented by the second device in various methods of the embodiments of the present disclosure, which will not be repeated herein for the sake of brevity.

Those of ordinary skill in the art will appreciate that the various exemplary units and algorithm steps described in combination with the embodiments disclosed herein may be implemented in electronic hardware or a combination of computer software and electronic hardware. Whether these functions are performed in hardware or software depends on the specific application and design constraints of the technical solutions. Professionals may use different methods for each particular application to implement the described functionality, but such implementation should not be considered outside the scope of the present disclosure.

Those skilled in the art will clearly appreciate that, for convenience and conciseness of description, the specific operating processes of the above described systems, apparatuses and units may refer to the corresponding processes in the aforementioned method embodiments, which will not be described herein for the sake of brevity.

In several embodiments provided herein, it should be understood that the disclosed systems, apparatuses and methods may be implemented in other ways. For example, the above embodiments of the apparatuses are only schematic, for example, the division of the units is only a logical function division, and in practice, there may be another division mode, for example, multiple units or components may be combined or integrated into another system, or some features may be ignored or not performed. On the other hand, the coupling, direct coupling or communication connection between each other shown or discussed may be indirect coupling or communication connection through some interfaces, apparatus or units, and may be electrical, mechanical or other form.

The units illustrated as separate components may or may not be physically separated, and the components displayed as units may or may not be physical units, i.e., may be located in one place, or may be distributed over multiple network units. Part or all of the units may be selected according to the actual needs to achieve the purpose of the embodiments.

In addition, various functional units in various embodiments of the present disclosure may be integrated in one processing unit, each unit may exist physically alone, or two or more units may be integrated in one unit.

When implemented in the form of software functional units, and sold or used as stand-alone products, the functions may be stored in a computer readable storage medium. With this understanding, the technical solution of the present disclosure in essence or in part contributing to the prior art may be embodied in the form of a software product. The computer software product is stored in a storage medium, and includes instructions for causing a computer device (which may be a personal computer, a server, a network device, etc.) to perform all or part of the steps of the methods described in various embodiments of the present disclosure. The above storage medium includes a U disk, a removable hard disk, a ROM, a RAM, a magnetic disk or an optical disk and other medium capable of storing program codes.

The above is only the specific embodiments of the present disclosure, but the scope of protection of the present disclosure is not limited thereto. Any technical person familiar with the technical field can easily think of changes or substitutions within the technical scope disclosed in the present disclosure, which should be covered within the scope of protection of the present disclosure. Therefore, the scope of protection of the present disclosure shall be subject to the scope of protection of the claims.

The invention claimed is:

1. A sensing method, comprising:
    transmitting, by a first device, target scheduling information to a second device, wherein the target scheduling information is used for determining a presence state of the second device in a directional multi-gigabit (DMG) sensing measurement, the first device is a sensing initiating device or a sensing by proxy (SBP) device, and the second device is a sensing response device,
    wherein the target scheduling information is used for determining a presence state of the second device in a DMG sensing instance or a presence state of the second device in a DMG sensing burst,
    wherein the target scheduling information comprises a fifth number field, and the fifth number field is used for indicating a number of DMG sensing instances with consecutive absence of the second device.

2. The method of claim 1, wherein,
    the fifth number field is used for indicating a number of DMG sensing instances with consecutive absence starting from a next DMG sensing instance.

3. The method of claim 2, wherein presence of the second device in the current DMG sensing instance is default.

4. The method of claim 1, wherein the fifth number field is sent during a DMG sensing measurement phase.

5. The method of claim 4, wherein the fifth number field is carried in a DMG Sensing Request frame or a Beam Refinement Protocol (BRP) frame.

6. The method of claim 5, wherein the fifth number field is carried in a Time Division Duplex (TDD) Beamforming Information field in a second frame.

7. The method of claim 6, wherein the fifth number field occupies bit B97 to bit B104 of the TDD Beamforming Information field.

8. The method of claim 6, wherein the TDD Beamforming Information field comprises at least one of:
    a DMG measurement setup identifier (ID) field, which occupies B0 bit to B7 bit of the TDD Beamforming Information field;
    a measurement burst ID field, which occupies B8 bit to B15 bit of the TDD Beamforming Information field;
    a sensing instance sequence number (SN) field, which occupies B16 bit to B23 bit of the TDD Beamforming Information field;
    a sensing type field, which occupies B24 bit to B26 bit of the TDD Beamforming Information field;
    a station (STA) ID field, which occupies B27 bit to B29 bit of the TDD Beamforming Information field;
    a first beam index field, which occupies B30 bit to B37 bit of the TDD Beamforming Information field;
    a number (Num) of STAs in instance field, which occupies B38 bit to B40 bit of the TDD Beamforming Information field;
    a Num of physical protocol data units (PPDUs) in instance field, which occupies B41 bit to B42 bit of the TDD Beamforming Information field;
    an enhanced DMG (EDMG) training (TRN) length field, which occupies B43 bit to B50 bit of the TDD Beamforming Information field;
    a RX TRN-Units per each TX TRN-Unit field, which occupies B51 bit to B58 bit of the TDD Beamforming Information field;
    a EDMG TRNUnit P field, which occupies B59 bit to B60 bit of the TDD Beamforming Information field;
    a EDMG TRNUnit M field, which occupies B61 bit to B64 bit of the TDD Beamforming Information field;
    a EDMG TRNUnit N field, which occupies B65 bit to B66 bit of the TDD Beamforming Information field;
    a TRN subfield sequence length field, which occupies B67 bit of the TDD Beamforming Information field;
    a bandwidth (BW) field, which occupies B68 bit to B75 bit of the TDD Beamforming Information field;
    a sense multiple Golays field, which occupies B76 bit of the TDD Beamforming Information field;
    a sense Golay index field, which occupies B77 bit to B79 bit of the TDD Beamforming Information field;
    a monostatic sounding mode field, which occupies B80 bit of the TDD Beamforming Information field;
    a Num of TX beams in instances field, which occupies B81 bit to B88 bit of the TDD Beamforming Information field;
    a Num of repeat in instances field, which occupies B89 bit to B96 bit of the TDD Beamforming Information field;
    a fifth number field, which occupies B97 bit to B104 bit of the TDD Beamforming Information field; and
    an updated TX Beam list field, which ends at B (8×n−1) bit of the TDD Beamforming Information field.

9. The method of claim 1, wherein the fifth number field is used for indicating a number of DMG sensing instances with consecutive presence of the second device.

10. The method of claim 9, wherein
    the fifth number field is used for indicating a number of DMG sensing instances with consecutive presence starting from a next DMG sensing instance.

11. A sensing device, comprising a processor and a memory, wherein the memory is configured to store a computer program, and the processor is configured to invoke and execute the computer program stored in the memory to perform:
    transmitting target scheduling information to a second device, wherein the target scheduling information is used for determining a presence state of the second device in a directional multi-gigabit (DMG) sensing measurement, the sensing device is a sensing initiating device or a sensing by proxy (SBP) device, and the second device is a sensing response device,
    wherein the target scheduling information is used for determining a presence state of the second device in a DMG sensing instance or a presence state of the second device in a DMG sensing burst,
    wherein the target scheduling information comprises a fifth number field, and the fifth number field is used for indicating a number of DMG sensing instances with consecutive absence of the second device.

12. The sensing device of claim 11, wherein,
the fifth number field is used for indicating a number of DMG sensing instances with consecutive absence or presence starting from a next DMG sensing instance.

13. The sensing device of claim 12, wherein presence of the second device in the current DMG sensing instance is default.

14. The sensing device of claim 11, wherein the fifth number field is sent during a DMG sensing measurement phase.

15. The sensing device of claim 14, wherein the fifth number field is carried in a DMG Sensing Request frame or a Beam Refinement Protocol (BRP) frame.

16. The sensing device of claim 15, wherein the fifth number field is carried in a Time Division Duplex (TDD) Beamforming Information field in a second frame.

17. The sensing device of claim 16, wherein the fifth number field occupies bit B97 to bit B104 of the TDD Beamforming Information field.

18. The sensing device of claim 16, wherein the TDD Beamforming Information field comprises at least one of:
a DMG measurement setup identifier (ID) field, which occupies B0 bit to B7 bit of the TDD Beamforming Information field;
a measurement burst ID field, which occupies B8 bit to B15 bit of the TDD Beamforming Information field;
a sensing instance sequence number (SN) field, which occupies B16 bit to B23 bit of the TDD Beamforming Information field;
a sensing type field, which occupies B24 bit to B26 bit of the TDD Beamforming Information field;
a station (STA) ID field, which occupies B27 bit to B29 bit of the TDD Beamforming Information field;
a first beam index field, which occupies B30 bit to B37 bit of the TDD Beamforming Information field;
a number (Num) of STAs in instance field, which occupies B38 bit to B40 bit of the TDD Beamforming Information field;
a Num of physical protocol data units (PPDUs) in instance field, which occupies B41 bit to B42 bit of the TDD Beamforming Information field;
an enhanced DMG (EDMG) training (TRN) length field, which occupies B43 bit to B50 bit of the TDD Beamforming Information field;
a RX TRN-Units per each TX TRN-Unit field, which occupies B51 bit to B58 bit of the TDD Beamforming Information field;
a EDMG TRNUnit P field, which occupies B59 bit to B60 bit of the TDD Beamforming Information field;
a EDMG TRNUnit M field, which occupies B61 bit to B64 bit of the TDD Beamforming Information field;
a EDMG TRNUnit N field, which occupies B65 bit to B66 bit of the TDD Beamforming Information field;
a TRN subfield sequence length field, which occupies B67 bit of the TDD Beamforming Information field;
a bandwidth (BW) field, which occupies B68 bit to B75 bit of the TDD Beamforming Information field;
a sense multiple Golays field, which occupies B76 bit of the TDD Beamforming Information field;
a sense Golay index field, which occupies B77 bit to B79 bit of the TDD Beamforming Information field;
a monostatic sounding mode field, which occupies B80 bit of the TDD Beamforming Information field;
a Num of TX beams in instances field, which occupies B81 bit to B88 bit of the TDD Beamforming Information field;
a Num of repeat in instances field, which occupies B89 bit to B96 bit of the TDD Beamforming Information field;
a fifth number field, which occupies B97 bit to B104 bit of the TDD Beamforming Information field; and
an updated TX Beam list field, which ends at B (8×n−1) bit of the TDD Beamforming Information field.

19. A sensing device, comprising a processor and a memory, wherein the memory is configured to store a computer program, and the processor is configured to invoke and execute the computer program stored in the memory to perform:
receiving target scheduling information sent by a first device, wherein the target scheduling information is used for determining a presence state of the sensing device in a directional multi-gigabit (DMG) sensing measurement, the first device is a sensing initiating device or a sensing by proxy (SBP) device, and the sensing device is a sensing response device,
wherein the target scheduling information is used for determining a presence state of the second device in a DMG sensing instance or a presence state of the second device in a DMG sensing burst,
wherein the target scheduling information comprises a fifth number field, and the fifth number field is used for indicating a number of DMG sensing instances with consecutive absence of the second device.

20. The sensing device of claim 19, wherein the fifth number field is carried in a Time Division Duplex (TDD) Beamforming Information field in a second frame, and the TDD Beamforming Information field comprises at least one of:
a DMG measurement setup identifier (ID) field, which occupies B0 bit to B7 bit of the TDD Beamforming Information field;
a measurement burst ID field, which occupies B8 bit to B15 bit of the TDD Beamforming Information field;
a sensing instance sequence number (SN) field, which occupies B16 bit to B23 bit of the TDD Beamforming Information field;
a sensing type field, which occupies B24 bit to B26 bit of the TDD Beamforming Information field;
a station (STA) ID field, which occupies B27 bit to B29 bit of the TDD Beamforming Information field;
a first beam index field, which occupies B30 bit to B37 bit of the TDD Beamforming Information field;
a number (Num) of STAs in instance field, which occupies B38 bit to B40 bit of the TDD Beamforming Information field;
a Num of physical protocol data units (PPDUs) in instance field, which occupies B41 bit to B42 bit of the TDD Beamforming Information field;
an enhanced DMG (EDMG) training (TRN) length field, which occupies B43 bit to B50 bit of the TDD Beamforming Information field;
a RX TRN-Units per each TX TRN-Unit field, which occupies B51 bit to B58 bit of the TDD Beamforming Information field;
a EDMG TRNUnit P field, which occupies B59 bit to B60 bit of the TDD Beamforming Information field;
a EDMG TRNUnit M field, which occupies B61 bit to B64 bit of the TDD Beamforming Information field;
a EDMG TRNUnit N field, which occupies B65 bit to B66 bit of the TDD Beamforming Information field;
a TRN subfield sequence length field, which occupies B67 bit of the TDD Beamforming Information field;
a bandwidth (BW) field, which occupies B68 bit to B75 bit of the TDD Beamforming Information field;

a sense multiple Golays field, which occupies B76 bit of the TDD Beamforming Information field;
a sense Golay index field, which occupies B77 bit to B79 bit of the TDD Beamforming Information field;
a monostatic sounding mode field, which occupies B80 bit of the TDD Beamforming Information field;
a Num of TX beams in instances field, which occupies B81 bit to B88 bit of the TDD Beamforming Information field;
a Num of repeat in instances field, which occupies B89 bit to B96 bit of the TDD Beamforming Information field;
a fifth number field, which occupies B97 bit to B104 bit of the TDD Beamforming Information field; and
an updated TX Beam list field, which ends at B (8×n−1) bit of the TDD Beamforming Information field.

* * * * *